US012562308B2

(12) United States Patent
Ikriannikov et al.

(10) Patent No.: US 12,562,308 B2
(45) Date of Patent: Feb. 24, 2026

(54) COUPLED INDUCTORS FOR LOW ELECTROMAGNETIC INTERFERENCE

(71) Applicant: MAXIM INTEGRATED PRODUCTS, INC., San Jose, CA (US)

(72) Inventors: Alexandr Ikriannikov, Castro Valley, CA (US); Di Yao, San Jose, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 436 days.

(21) Appl. No.: 17/456,086

(22) Filed: Nov. 22, 2021

(65) Prior Publication Data

US 2022/0084743 A1 Mar. 17, 2022

Related U.S. Application Data

(62) Division of application No. 15/680,592, filed on Aug. 18, 2017, now Pat. No. 11,183,328.

(Continued)

(51) Int. Cl.

| | |
|---|---|
| ***H01F 27/24*** | (2006.01) |
| ***H01F 1/147*** | (2006.01) |
| ***H01F 1/34*** | (2006.01) |
| ***H01F 3/10*** | (2006.01) |
| ***H01F 27/255*** | (2006.01) |

(Continued)

(52) U.S. Cl.

CPC ........... *H01F 27/346* (2013.01); *H01F 1/147* (2013.01); *H01F 1/34* (2013.01); *H01F 3/10* (2013.01); *H01F 27/255* (2013.01); *H01F 27/2823* (2013.01); *H01F 38/08* (2013.01); *H01F 2003/106* (2013.01)

(58) Field of Classification Search

CPC .................................................... H01F 27/346
USPC ......................................................... 336/212
See application file for complete search history.

(56) References Cited

U.S. PATENT DOCUMENTS

| | | | | |
|---|---|---|---|---|
| 3,495,264 A * | 2/1970 | Spears | H01Q 7/08 343/788 |
| 6,362,986 B1 * | 3/2002 | Schultz | H02M 3/158 363/132 |

(Continued)

FOREIGN PATENT DOCUMENTS

| | | |
|---|---|---|
| CN | 1534696 A | 10/2004 |
| CN | 101106014 A | 1/2008 |

(Continued)

OTHER PUBLICATIONS

Chinese Patent Application No. 2017107112779, 2nd Office Action dated Apr. 1, 2021, with English translation, 18 pages.

(Continued)

*Primary Examiner* — Ronald Hinson
(74) *Attorney, Agent, or Firm* — Schwegman Lundberg & Woessner, P.A.

(57) ABSTRACT

A coupled inductor for low electromagnetic interference includes a plurality of windings and a composite magnetic core including a coupling magnetic structure formed of a first magnetic material and a leakage magnetic structure formed of a second magnetic material having a distributed gap. The coupling magnetic structure magnetically couples together the plurality of windings, and the leakage magnetic structure provides leakage magnetic flux paths for the plurality of windings.

18 Claims, 38 Drawing Sheets

Related U.S. Application Data

(60) Provisional application No. 62/377,455, filed on Aug. 19, 2016.

(51) Int. Cl.

| | |
|---|---|
| ***H01F 27/28*** | (2006.01) |
| ***H01F 27/34*** | (2006.01) |
| ***H01F 38/08*** | (2006.01) |

(56) References Cited

U.S. PATENT DOCUMENTS

| | | | | |
|---|---|---|---|---|
| 6,980,077 | B1 | 12/2005 | Chandrasekaran et al. | |
| 7,352,269 | B2 | 4/2008 | Li et al. | |
| 8,237,530 | B2 | 8/2012 | Ikriannikov | |
| 8,723,629 | B1 | 5/2014 | Liu et al. | |
| 8,975,995 | B1 | 3/2015 | Ikriannikov | |
| 2004/0113741 | A1 | 6/2004 | Li et al. | |
| 2008/0024255 | A1* | 1/2008 | Sano | H01F 17/045 335/297 |
| 2016/0111203 | A1* | 4/2016 | Yamamoto | H01F 37/00 336/212 |
| 2017/0309395 | A1* | 10/2017 | Shiraki | H03H 7/01 |
| 2018/0053596 | A1 | 2/2018 | Ikriannikov et al. | |

FOREIGN PATENT DOCUMENTS

| | | | |
|---|---|---|---|
| CN | 101118801 | A | 2/2008 |
| CN | 102314998 | A | 1/2012 |
| CN | 202102857 | U | 1/2012 |
| CN | 102576593 | A | 7/2012 |
| CN | 102947904 | A | 2/2013 |
| CN | 204348470 | U | 5/2015 |
| CN | 104851553 | A | 8/2015 |
| CN | 204857392 | U | 12/2015 |

OTHER PUBLICATIONS

Chinese Patent Application No. 2017107111277.9, First Office Action, dated Aug. 7, 2020; 19 pages.

"U.S. Appl. No. 15/680,592, Advisory Action mailed Mar. 3, 2021", 2 pgs.

"U.S. Appl. No. 15/680,592, Final Office Action mailed Dec. 23, 2020", 11 pgs.

"U.S. Appl. No. 15/680,592, Non Final Office Action mailed Jun. 1, 2020", 11 pgs.

"U.S. Appl. No. 15/680,592, Notice of Allowance mailed Apr. 9, 2021", 12 pgs.

"U.S. Appl. No. 15/680,592, Notice of Allowance mailed Jul. 22, 2021", 11 pgs.

"U.S. Appl. No. 15/680,592, Response filed Feb. 23, 2021 to Final Office Action mailed Dec. 23, 2020", 9 pgs.

"U.S. Appl. No. 15/680,592, Response filed May 6, 2020 to Restriction Requirement mailed Mar. 6, 2020", 2 pgs.

"U.S. Appl. No. 15/680,592, Response filed Sep. 11, 2020 to Non Final Office Action mailed Jun. 1, 2020", 10 pgs.

"U.S. Appl. No. 15/680,592, Restriction Requirement mailed Mar. 6, 2020", 7 pgs.

"Chinese Application Serial No. 201710711277.9, Office Action mailed Apr. 1, 2021", W/English Translation, 19 pgs.

"Chinese Application Serial No. 201710711277.9, Office Action mailed Aug. 7, 2020", W/English Translation, 17 pgs.

"Chinese Application Serial No. 202210101723.5, Office Action mailed Jan. 5, 2024", W/English Translation, 14 pgs.

"Chinese Application Serial No. 202210101723.5, Office Action mailed Jul. 31, 2024" W/English Translation, 10 pgs.

"European Application Serial No. 202210101723.5, Response to Examiner Telephone Interview filed Jan. 22, 2025", w/English claims, 6 pgs.

* cited by examiner

COUPLED INDUCTORS FOR LOW ELECTROMAGNETIC INTERFERENCE

RELATED APPLICATIONS

This application is a division of U.S. application Ser. No. 15/680,592, filed Aug. 18, 2017 which claims benefit of priority to U.S. Provisional Patent Application Ser. No. 62/377,455, filed Aug. 19, 2016, the contents of each are incorporated herein by references in their entireties.

BACKGROUND

It is known to electrically couple multiple switching sub-converters in parallel to increase switching power converter capacity and/or to improve switching power converter performance. One type of switching power converter with multiple switching sub-converters is a "multi-phase" switching power converter, where the sub-converters, which are often referred to as "phases," switch out-of-phase with respect to each other. Such out-of-phase switching results in ripple current cancellation at the converter output filter and allows the multi-phase converter to have a better transient response than an otherwise similar single-phase converter.

As taught in U.S. Pat. No. 6,362,986 to Schultz et al., which is incorporated herein by reference, a multi-phase switching power converter's performance can be improved by magnetically coupling the energy storage inductors of two or more phases. Such magnetic coupling results in ripple current cancellation in the inductors and increases ripple switching frequency, thereby improving converter transient response, reducing input and output filtering requirements, and/or improving converter efficiency, relative to an otherwise identical converter without magnetically coupled inductors.

Two or more magnetically coupled inductors are often collectively referred to as a "coupled inductor" and have associated leakage inductance and magnetizing inductance values. Magnetizing inductance is associated with magnetic coupling between windings; thus, the larger the magnetizing inductance, the stronger the magnetic coupling between windings. Leakage inductance, on the other hand, is associated with energy storage. Thus, the larger the leakage inductance, the more energy stored in the inductor. Leakage inductance results from leakage magnetic flux, which is magnetic flux generated by current flowing through one winding of the coupled inductor that is not coupled to the other windings of the inductor.

FIG. 1 is a perspective view of a prior art coupled inductor 100 including a magnetic core 102 magnetically coupling together a plurality of windings 104. Magnetic core 102 is shown in wire view, i.e., only its outline is shown, to show interior features of coupled inductor 100. Magnetic core 102 is typically formed of a ferrite magnetic material and includes a gap 106 in its leakage magnetic flux path. Gap 106 is typically formed of air or another non-magnetic material and provides for energy storage within coupled inductor 100, thereby helping prevent magnetic saturation of coupled inductor 100. Leakage inductance values of coupled inductor 100 can be adjusted during the design coupled inductor 100 by adjusting the size of gap 106. Several examples of prior art coupled inductors similar to coupled inductor 100 are disclosed in U.S. Pat. No. 8,237,530 to Ikriannikov, which is incorporated herein by reference.

DETAILED DESCRIPTION OF THE EMBODIMENTS

Figure 1:
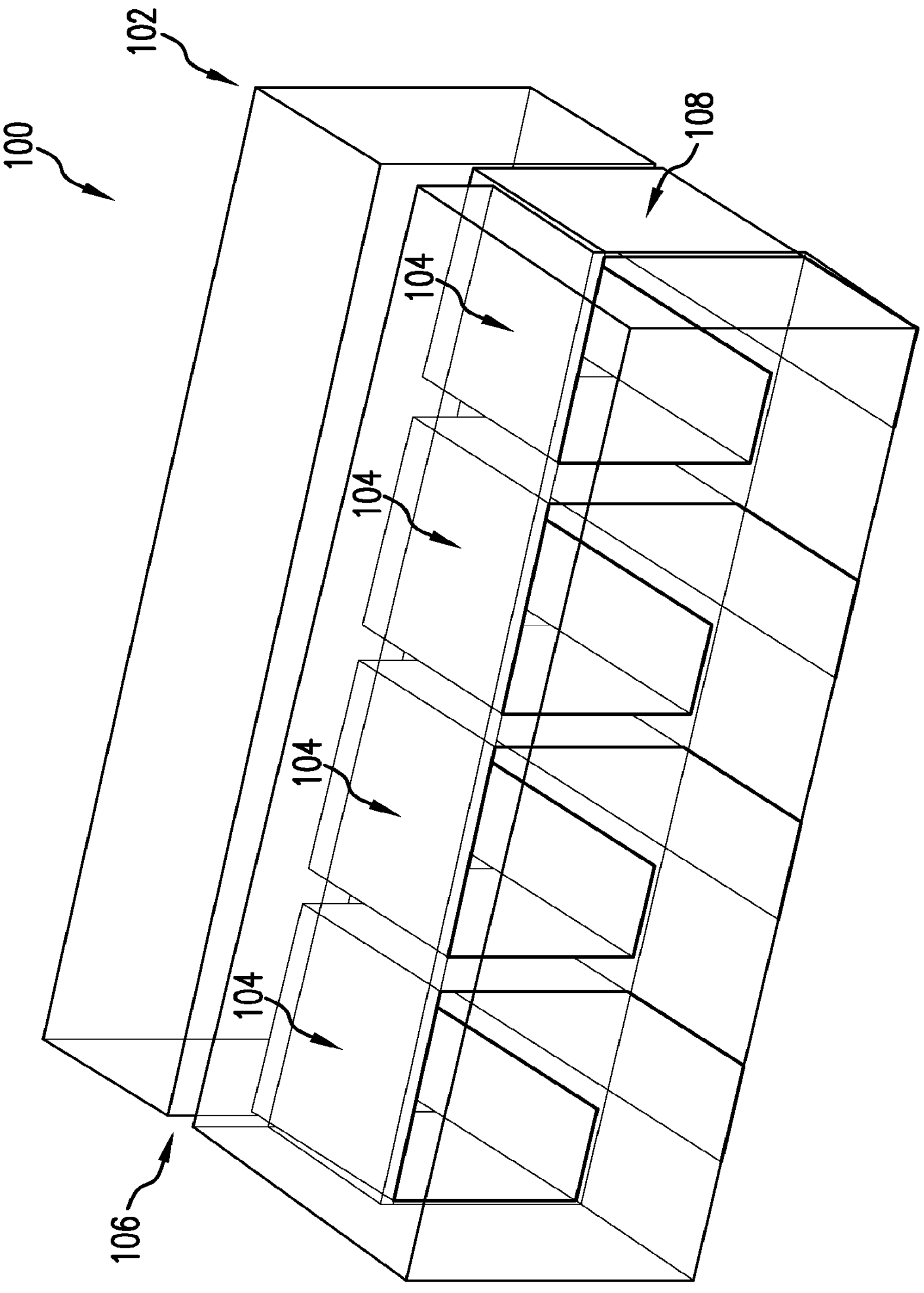
(PRIOR ART) FIG.1
FIG. 1 is a perspective view of a prior art coupled inductor.

Prior art coupled inductor 100 of FIG. 1 realizes significant advantages. For example, it has a small footprint, it promotes strong magnetic coupling of windings 104, and it provides short, balanced, and controllable leakage magnetic flux paths. However, Applicant has determined that coupled inductor 100, as well as other prior art coupled inductors, may not achieve sufficient electromagnetic compatibility in applications requiring low electromagnetic interference, such as certain automotive, industrial control, and medical applications. For example, gap 106 typically must be relatively large to achieve required energy storage capability, and this large gap may result in significant fringing magnetic flux, which is magnetic flux that travels outside of magnetic core 102. Fringing magnetic flux may couple to nearby electrical circuitry, potentially interfering with operation of the circuitry. Additionally, fringing magnetic flux may induce Eddy currents in nearby metallic conductors both within and outside of coupled inductor 100, resulting in heating of the metallic conductors and associated power loss. Furthermore, windings 104 are partially exposed in coupled inductor 100, which may result in undesired capacitive coupling of windings 104 to nearby components, particularly in switching power converter applications of coupled inductor 100 where windings 104 experience high rates of change in voltage.

Accordingly, Applicant has developed coupled inductors for low electromagnetic interference, which at least partially overcome one or more of the problems discussed above. These coupled inductors include a composite magnetic core including a coupling magnetic structure and a leakage magnetic structure. In some embodiments, the coupling magnetic structure is at least partially embedded in the leakage magnetic structure. The coupling magnetic structure is formed of a magnetic material having a relatively high magnetic permeability, such as a ferrite material, and the coupling magnetic structure magnetically couples together a plurality of windings of the coupled inductor. The leakage magnetic structure is formed of magnetic material having a relatively low magnetic permeability and a distributed gap, such as powder iron within a binder that is molded or disposed as a film in multiple layers. The leakage magnetic structure at least partially provides leakage magnetic flux paths for the windings, and the distributed gap of the leakage magnetic structure eliminates the need for a discrete gap, such as gap 106 of FIG. 1, thereby helping minimize fringing magnetic flux. Additionally, in some embodiments, the coupling magnetic structure at least partially shields the windings of the coupled inductor from external components, thereby helping minimize capacitive coupling between the windings and external components.

Disclosed below are a number of examples of these coupled inductors for low electromagnetic interference. It should be appreciated, however, that variations of these embodiments are possible and are within the scope of the present disclosure.

Figure 2:
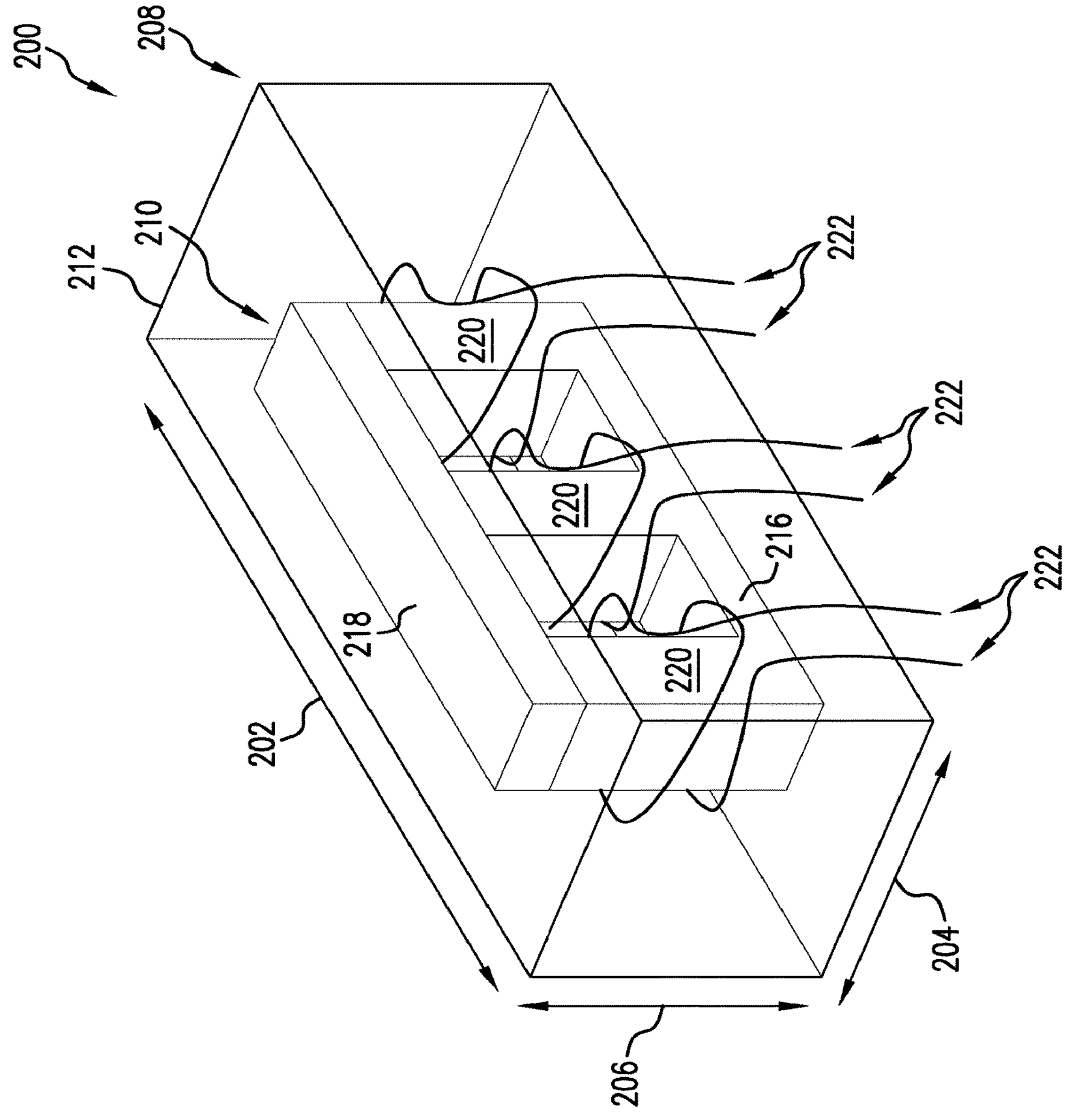
FIG. 2 is a perspective view of a coupled inductor for low electromagnetic interference, according to an embodiment.
Figure 3:
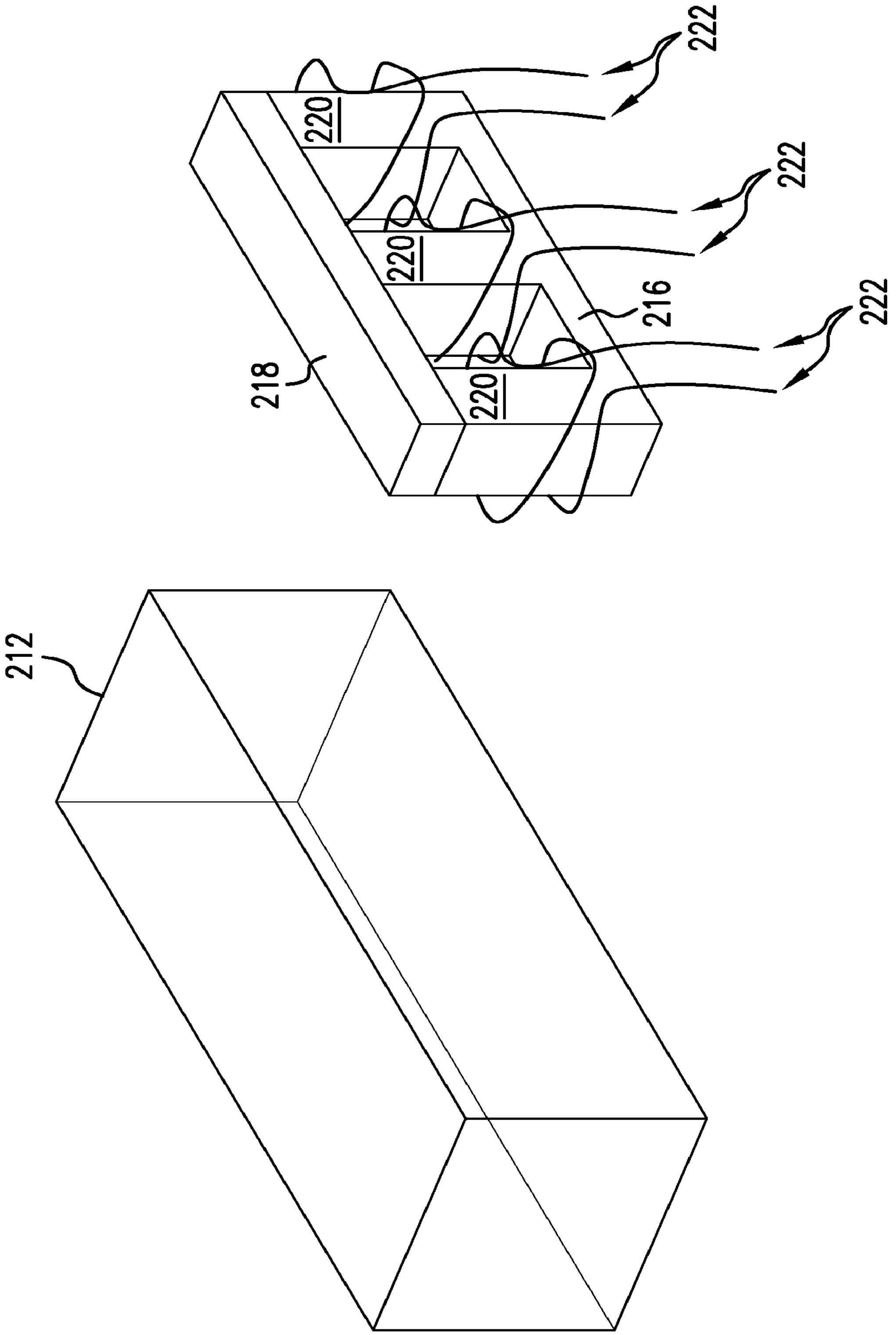
FIG. 3 is an exploded perspective view of the FIG. 2 coupled inductor.

FIG. 2 is a perspective view of a coupled inductor 200 for low electromagnetic interference having a length 202, a width 204, and a height 206. Coupled inductor 200 includes a composite magnetic core 208 including a coupling magnetic structure 210 at least partially embedded in a leakage magnetic structure 212. Leakage magnetic structure 212 is shown in wire view so that interior portions of coupled inductor 200 are visible, and FIG. 3 is an exploded perspective viewed of coupled inductor 200 with leakage magnetic structure 212 separated from the remainder of coupled inductor 200. Only the exterior outline of leakage magnetic structure 212 is shown in FIG. 3 to promote illustrative clarity.

Coupling magnetic structure 210 is a ladder magnetic core including a first rail 216, a second rail 218, and a plurality of coupling teeth 220. First rail 216 is separated from second rail 218 in the height 206 direction, and each coupling tooth 200 is disposed between first rail 216 and second rail 218 in the height 206 direction. Although not required, it is anticipated that coupling magnetic structure 210 will typically form one or more small gaps, such as in series with each coupling tooth 220, to control magnetizing inductance of coupled inductor 200. A respective winding 222 forms one or more turns around each coupling tooth 220. Coupling magnetic structure 210 magnetically couples together windings 222, and coupling magnetic structure 210 is formed of a first magnetic material having a relatively high magnetic permeability, such as a ferrite material, to promote strong magnetic coupling of windings 222.

Leakage magnetic structure 212 is formed of a second magnetic material having a distributed gap, such as powder iron within a binder that is molded or disposed in multiple film layers. Leakage magnetic structure 212 provides paths for leakage magnetic flux between first rail 216 and second rail 218 in the height 206 direction. Additionally, in embodiments where leakage magnetic structure 212 extends significantly beyond coupling magnetic structure 210 in any one of the length 202, width 204, or height 206 directions, leakage magnetic structure 212 also provides paths for leakage magnetic flux outside of coupling magnetic structure 210. The second magnetic material forming leakage magnetic structure 212 typically has a lower magnetic permeability than the first magnetic material forming coupling magnetic structure 210, since it is typically desirable that magnetizing inductance of coupled inductor 200 be significantly greater than leakage inductance of coupled inductor 200. Desired leakage inductance values are achieved by varying the magnetic permeability of the second magnetic material and/or cross-sectional area of leakage magnetic structure 212, during the design of coupled inductor 200.

It should be appreciated that there are no exposed gaps in composite magnetic core 208. Consequentially, there is minimal generation of fringing magnetic flux and associated electromagnetic interference and power loss. Additionally, coupling magnetic structure 210 serves as a shield, i.e., it separates windings 222 from external components, thereby helping minimize capacitive coupling between windings 222 and external components.

The number of coupling teeth 220 and associated windings 222 can be varied without departing from the scope hereof, as long as coupled inductor 200 includes at least two coupling teeth 220 and associated windings 222. Additionally, the configuration of windings 222 can be varied. For example, windings 222 can form fewer or greater number of turns than illustrated in FIGS. 2 and 3. Additionally, although windings 222 are illustrated as being wire windings, windings 222 could be foil windings or helical windings. Furthermore windings 222 could terminate on a different side of coupled inductor 200 than that illustrated, and/or windings 222 could terminate in a different manner than that illustrated, such as at contacts for surface mount connection to a printed circuit board.

Figure 4:
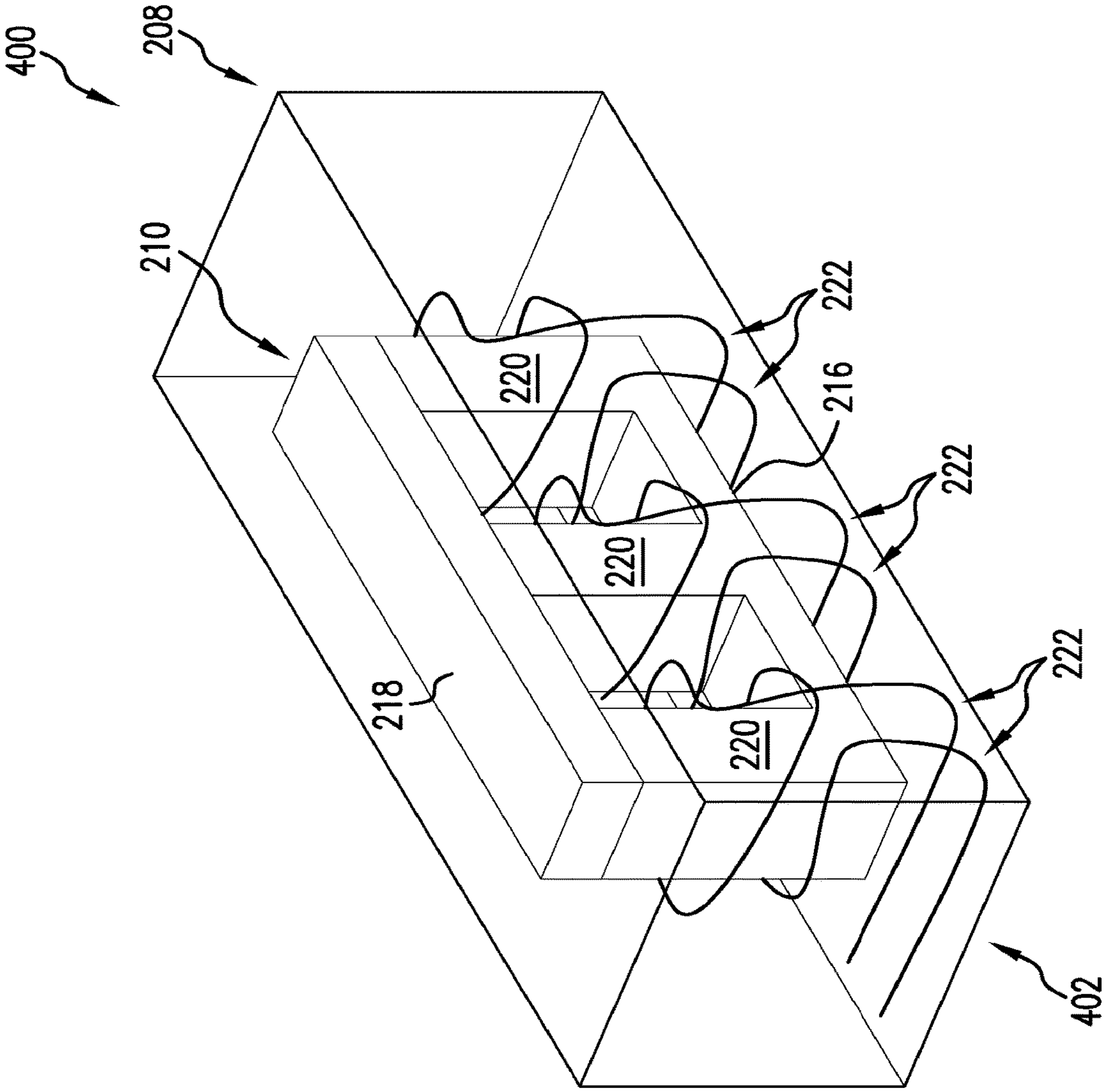
FIG. 4 is a perspective view of a coupled inductor for low electromagnetic interference like that of FIG. 2, but with windings ends disposed along a bottom surface of a leakage magnetic structure, according to an embodiment.
Figure 5:
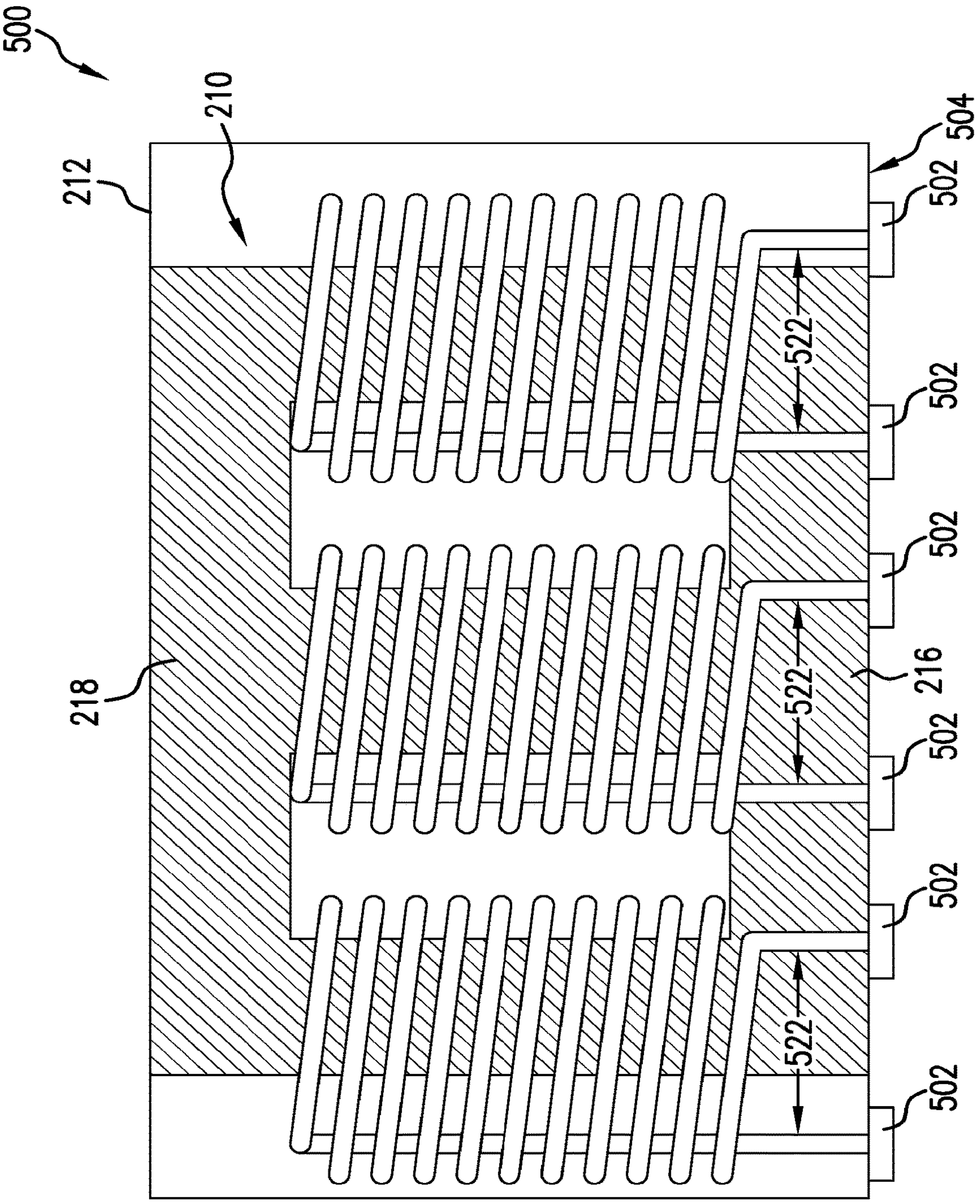
FIG. 5 is a side elevational view of a coupled inductor for low electromagnetic interference like that FIG. 2, but with windings having additional turns and terminating at contacts on a bottom surface of a leakage magnetic structure, according to an embodiment.

For example, FIG. 4 is a perspective view of a coupled inductor 400 for low electromagnetic interference like coupled inductor 200 of FIG. 2, but with ends of windings 222 disposed along a bottom surface 402 of leakage magnetic structure 212 to create solderable contacts. As another example, FIG. 5 is a side elevational view of a coupled inductor 500 for low electromagnetic interference like coupled inductor 200 of FIG. 2, but with windings 222 replaced with windings 522 having additional turns and terminating at contacts 502 on a bottom surface 504 of leakage magnetic structure 212. Similar to FIGS. 2 and 3, leakage magnetic structure 212 is shown in wire view in FIGS. 4 and 5 to show interior features of the coupled inductor.

Figure 6:
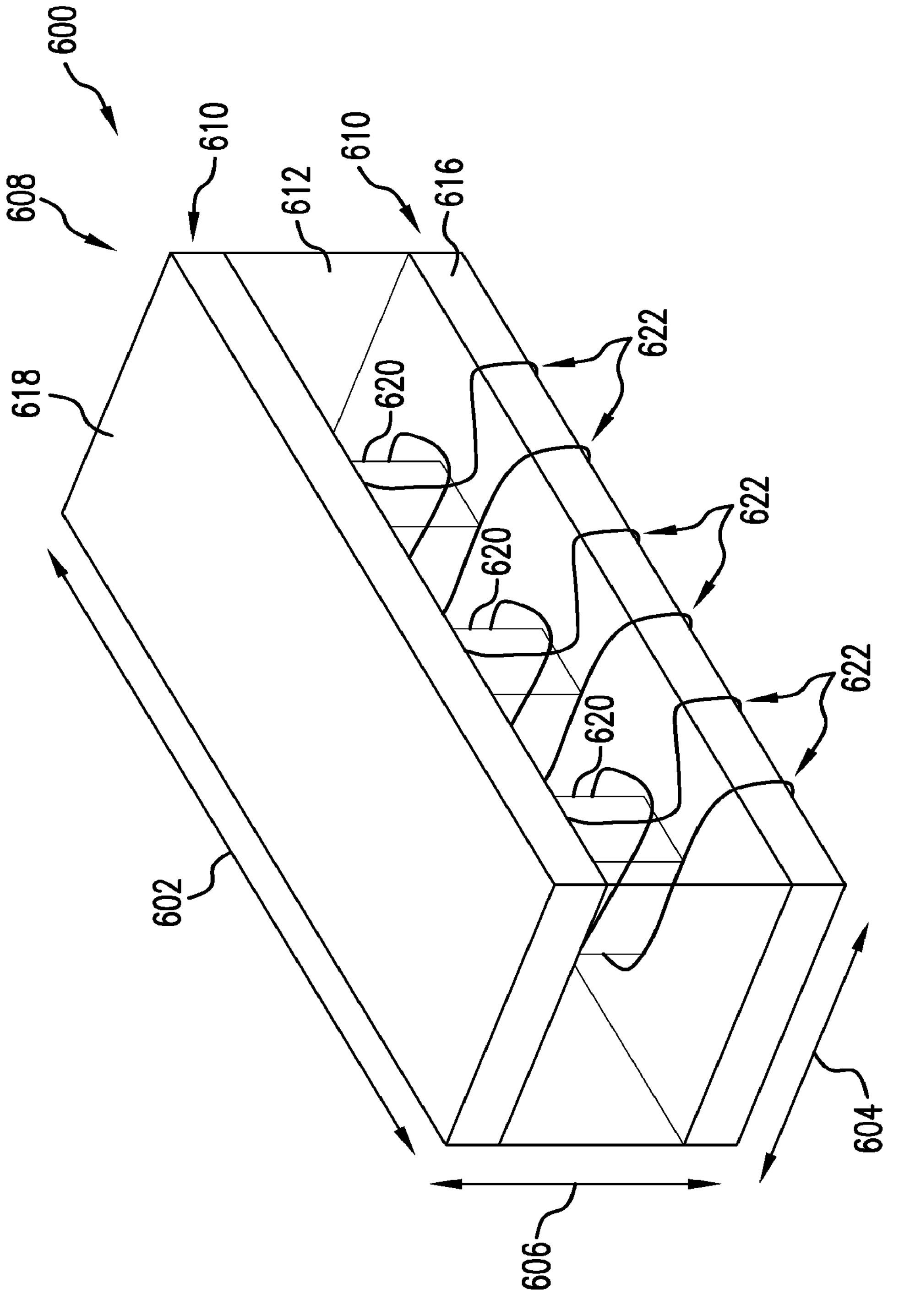
FIG. 6 is a prospective view of a coupled inductor for low electromagnetic interference including a coupling magnetic structure with leakage extensions, according to an embodiment.
Figure 7:
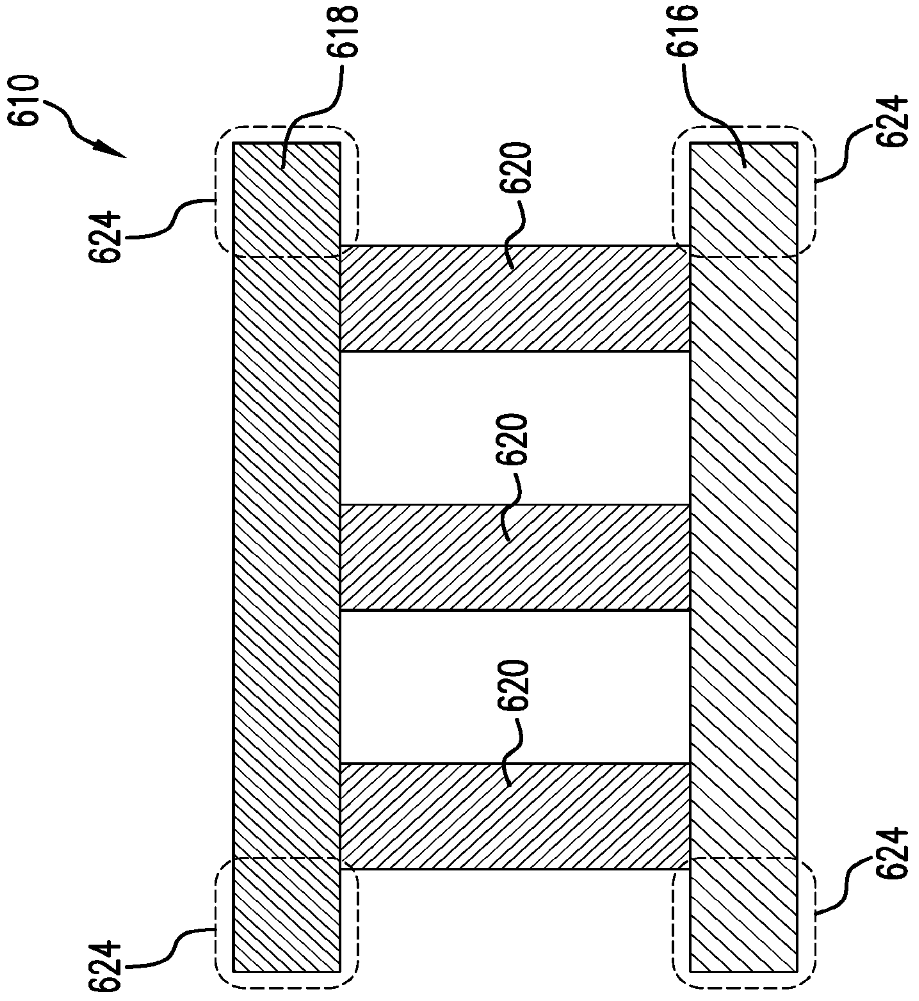
FIG. 7 is a side elevational view of the coupling magnetic structure of the FIG. 6 coupled inductor.

First and second rails 216 and 218 could be extended in the lengthwise 202 direction to create extensions of coupling magnetic structure 210, thereby potentially reducing losses in leakage magnetic flux paths and increasing mechanical robustness of the coupled inductor. For example, FIG. 6 is a perspective view of a coupled inductor 600 for low electromagnetic interference having a length 602, a width 604, and a height 606. Coupled inductor 600 has a composite magnetic core 608 and is similar to coupled inductor 200 of FIG. 2, but composite magnetic core 608 includes a coupling magnetic structure 610 with first and second rails 616 and 618 extending beyond outer coupling teeth 620 in the lengthwise 602 direction, to form leakage extensions 624. FIG. 7 is a side elevational view of coupling magnetic structure 610 separated from the remainder of coupled inductor 600. A respective winding 622 is wound around each coupling tooth 620. A leakage magnetic structure 612 is disposed between first rail 616 and second rail 618 in the height 606 direction. Leakage magnetic structure 612 is shown in wire view in FIG. 6 to show interior features of coupled inductor 600.

Coupling magnetic structure 610 is formed of a first magnetic material, and leakage magnetic structure 612 is formed of a second magnetic material having a distributed gap, where the magnetic permeability of the first magnetic material is typically greater than that of the second magnetic material, so that magnetizing inductance is greater than leakage inductance. Leakage magnetic structure 612 provides a path for leakage magnetic flux in the height 606 direction between first rail 616 and second rail 618. Leakage extensions 624 decrease reluctance of leakage magnetic flux paths at outer edges of coupled 600, and leakage extensions 624 may reduce losses in embodiments where the relatively high permeability first magnetic material forming coupling magnetic structure 610 has lower losses than the relatively low magnetic permeability second magnetic material forming leakage magnetic structure 612. Additionally, coupling magnetic structure 610 bounds leakage magnetic structure 612 in the height 606 direction, which promotes mechanical robustness of coupled inductor 600.

In a manner similar to the other coupled inductors discussed above, the number of coupling teeth 620 and associated windings 622 may be varied without departing from the scope hereof, as long as coupled inductor 600 includes at least two coupling teeth 620 and associated windings 622. Additionally, the configuration and/or termination of windings 622 can be modified. For example, windings 622 could be foil or helical windings instead of wire windings. As another example, windings 622 could terminate on a different side of coupled inductor 600, and/or in a different manner than that of FIG. 6.

Figure 8:
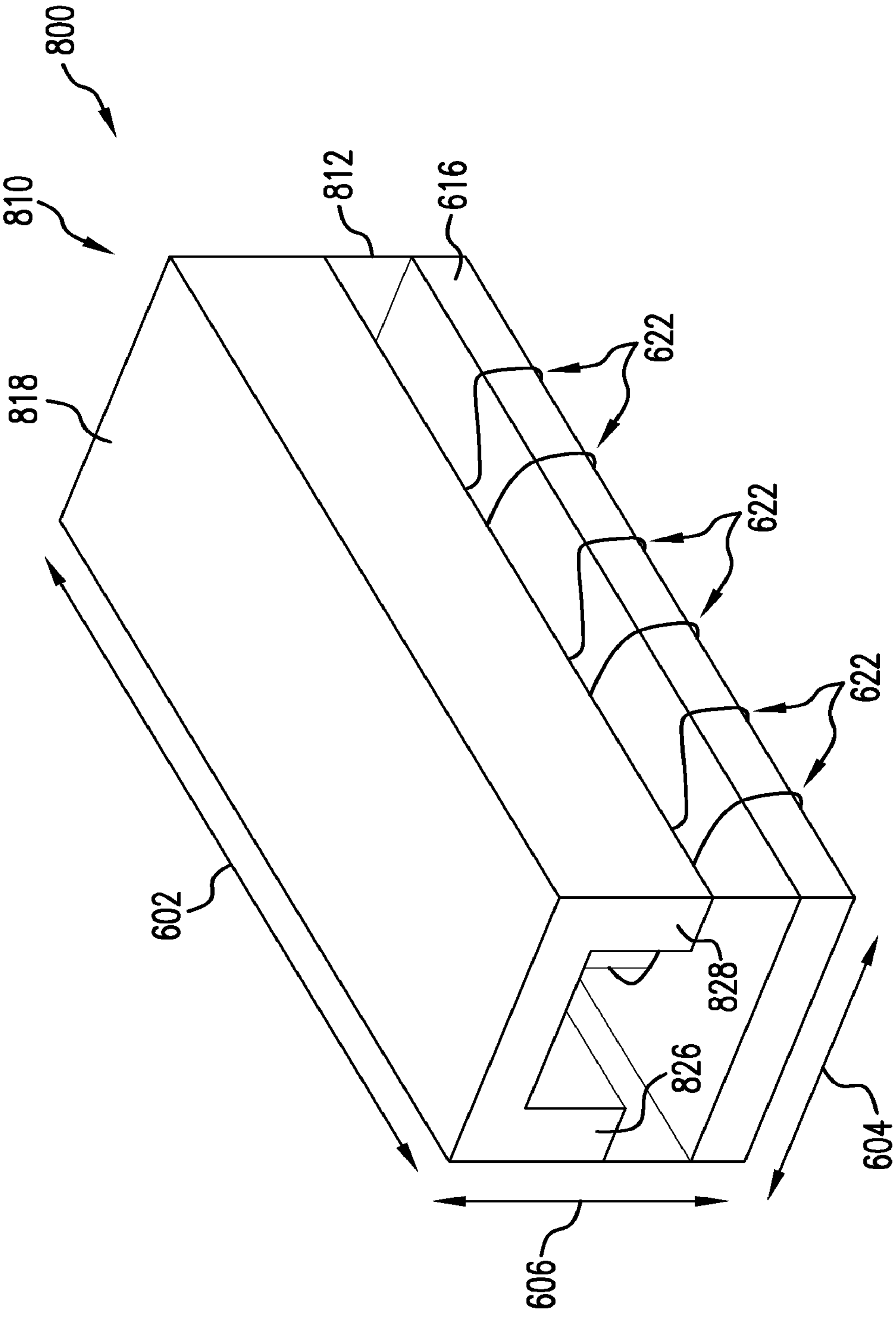
FIG. 8 is a perspective view of a coupled inductor for low electromagnetic interference with a rail including extensions, according to an embodiment.
Figure 9:
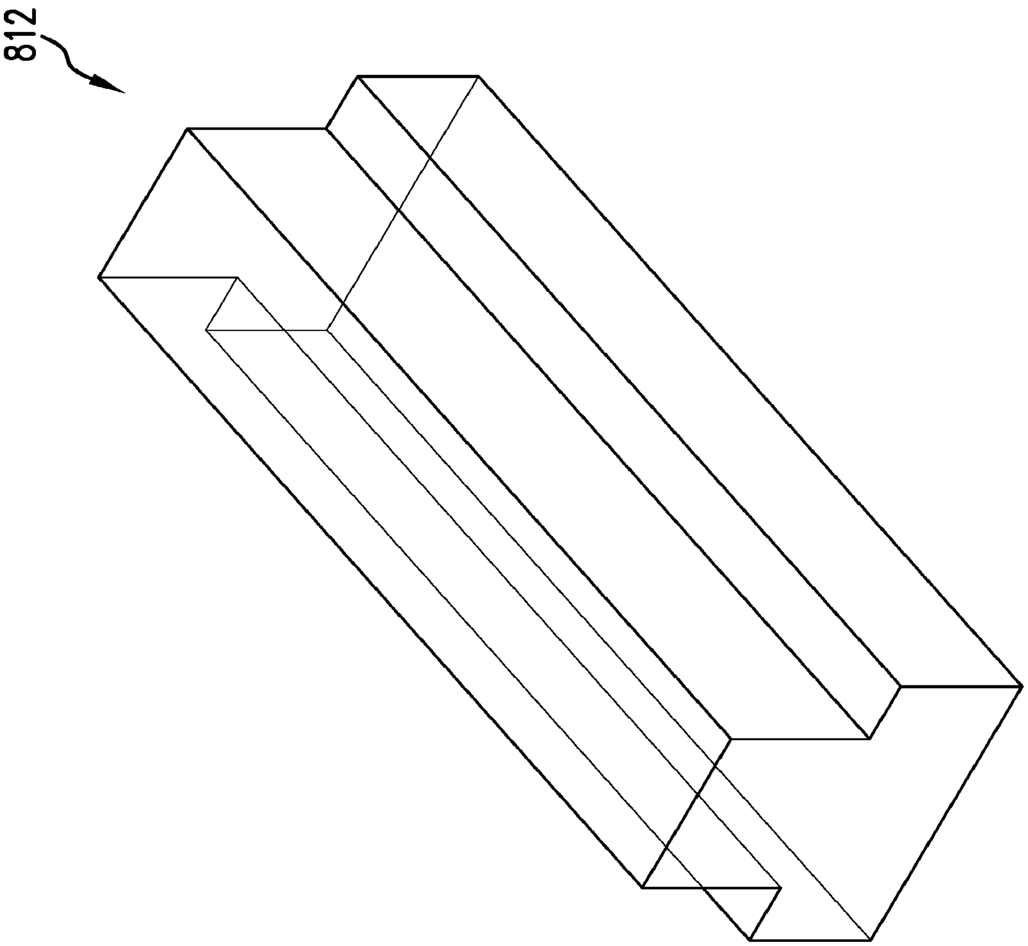
FIG. 9 is a perspective of a leakage magnetic structure of the FIG. 8 coupled inductor separated from the remainder of the coupled inductor.
Figure 10:
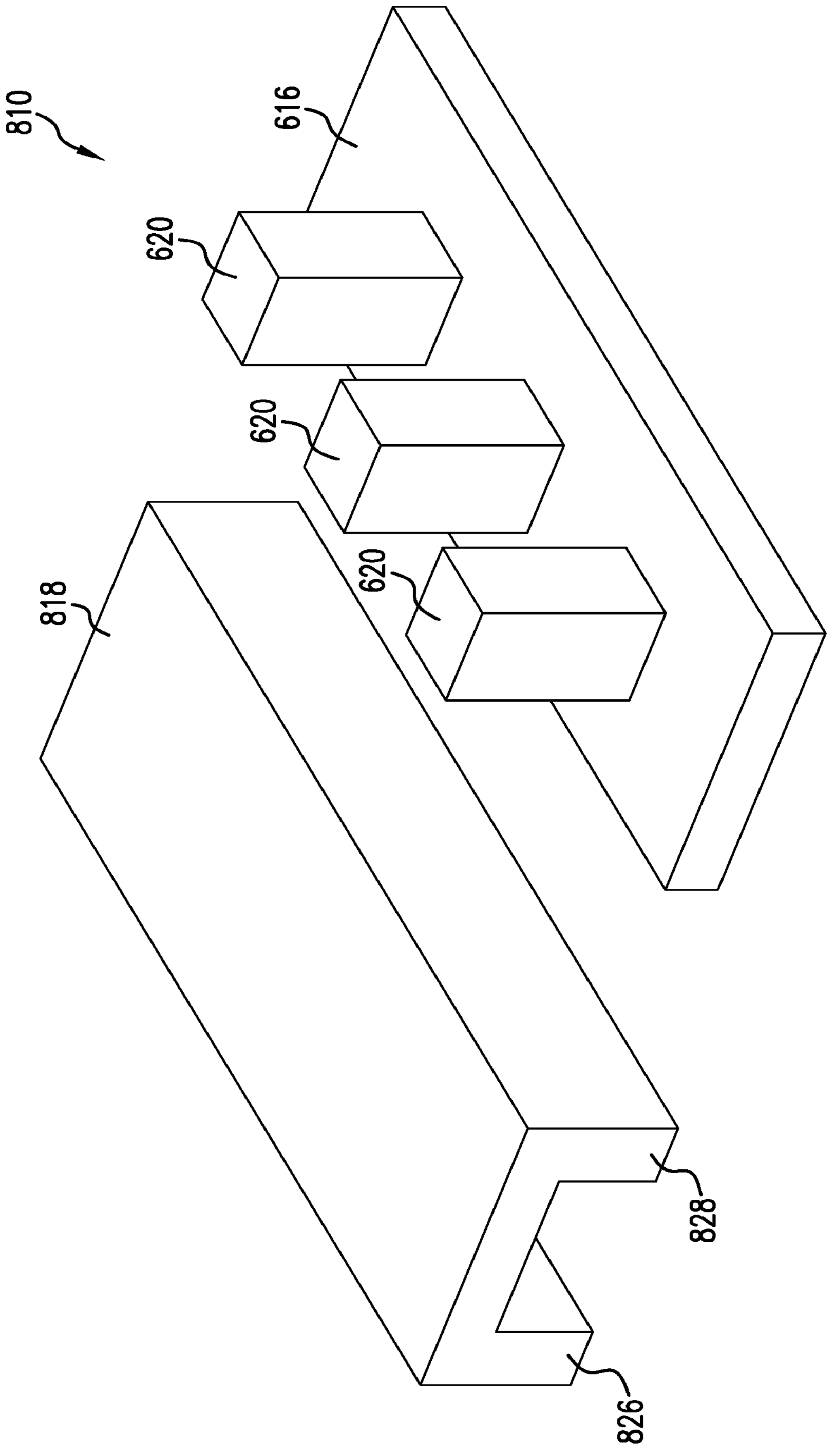
FIG. 10 is an exploded perspective view of coupling magnetic structure of the FIG. 8 coupled inductor.

FIG. 8 is a perspective view of a coupled inductor 800 for low electromagnetic interference like coupled inductor 600 of FIG. 6, but with second rail 618 replaced with a second rail 818 including extensions 826 and 828 extending toward first rail 616 in the height 606 direction. Second rail 818 has a u-shape when viewed cross-sectionally in the lengthwise 602 direction. Extensions 826 and 828 decrease reluctance of leakage magnetic flux paths in the height 606 direction, thereby promoting large leakage inductance values and/or low losses in the leakage paths. Leakage magnetic structure 612 of FIG. 6 is also replaced with a leakage magnetic structure 812 in FIG. 8, to accommodate the u-shape of second rail 818. FIG. 9 is a perspective of leakage magnetic structure 812 separated from the remainder of coupled inductor 800, and FIG. 10 is an exploded perspective view of coupling magnetic structure 810. Leakage magnetic structure 812 is shown in wire view in each of FIGS. 8 and 9, and only the outline of leakage magnetic structure 812 is shown in FIG. 9.

Figure 11:
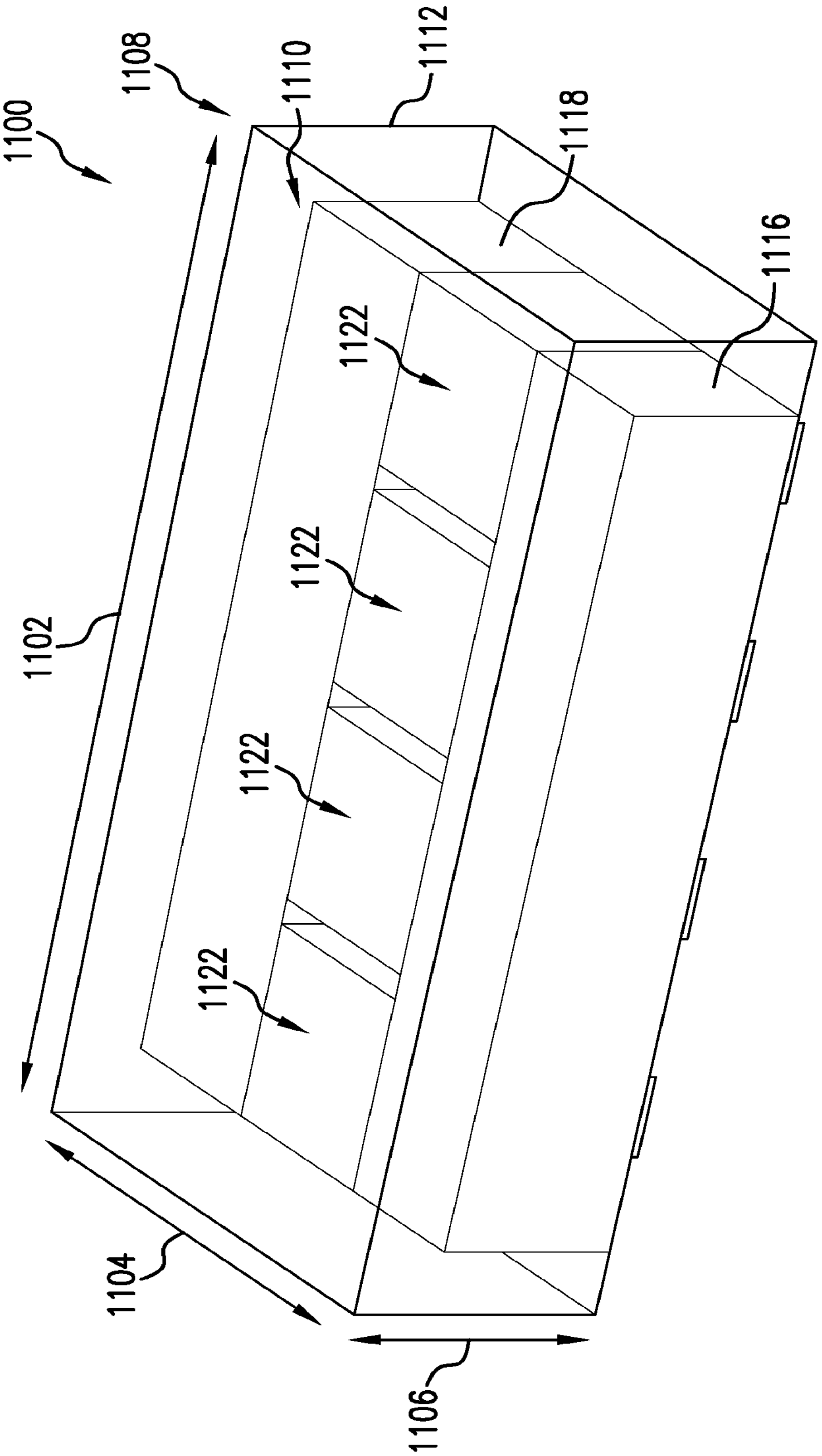
FIG. 11 is a perspective view of another coupled inductor for low electromagnetic interference, according to an embodiment.
Figure 12:
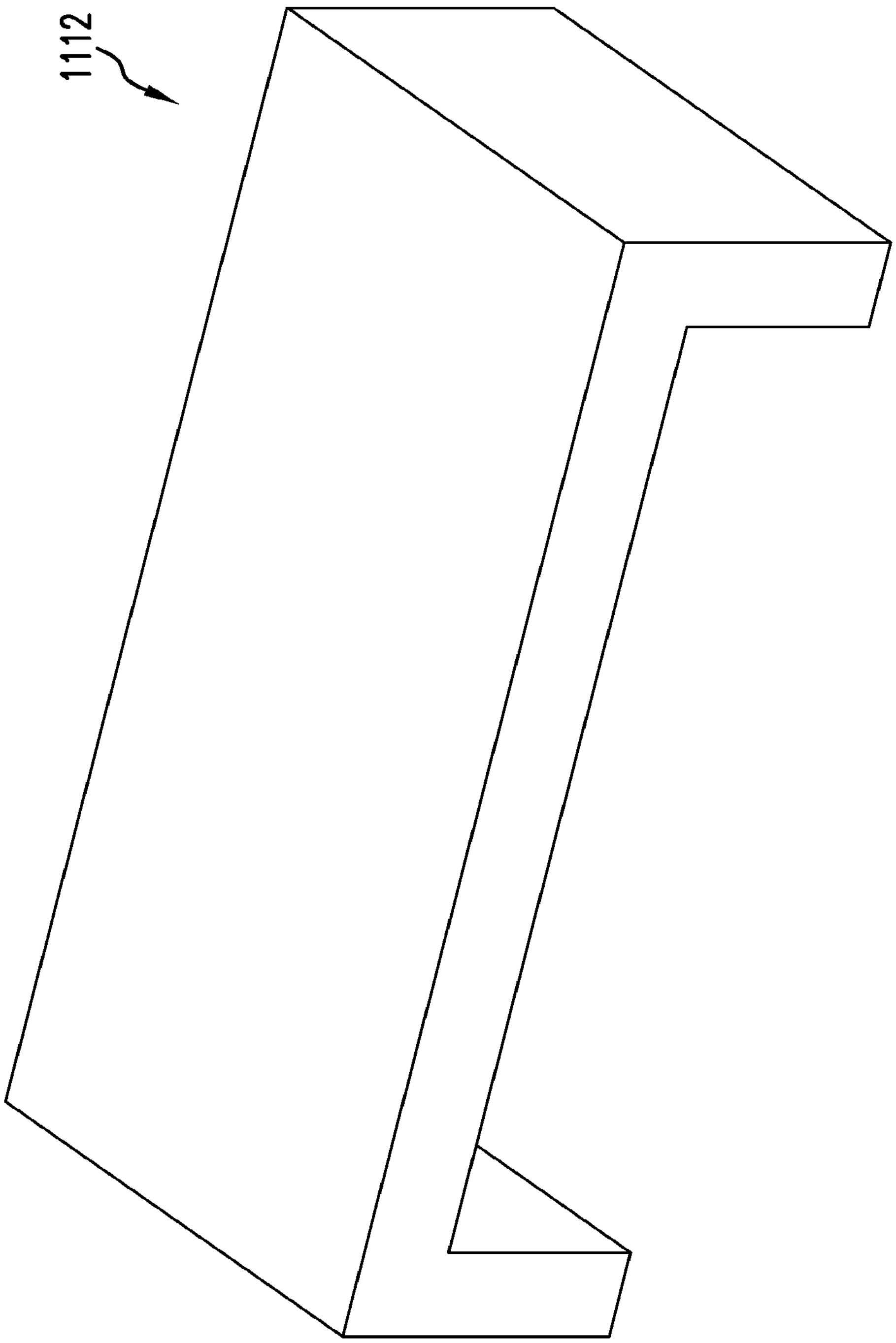
FIG. 12 is a perspective view of a leakage magnetic structure of the FIG. 11 coupled inductor separated from the remainder of the coupled inductor.
Figure 13:
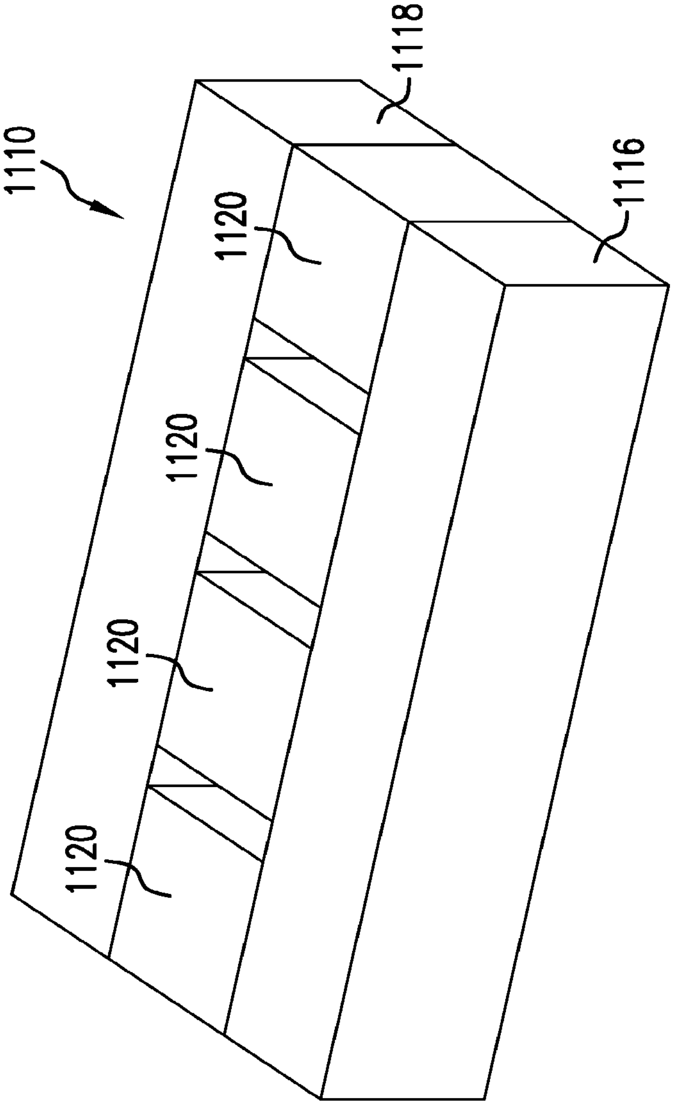
FIG. 13 is a perspective view of a coupling magnetic structure of the FIG. 11 coupled inductor separated from the remainder of the coupled inductor.

Applicant has also developed coupled inductors for low electromagnetic interference where leakage magnetic paths are primarily outside of the coupling magnetic structure. For example, FIG. 11 is a perspective view of a coupled inductor 1100 for low electromagnetic interference having a length 1102, a width 1104, and a height 1106. Coupled inductor 1100 includes a composite magnetic core 1108 including a coupling magnetic structure 1110 and a leakage magnetic structure 1112. Leakage magnetic structure 1112 is shown in wire view in FIG. 11 so that interior features of coupled inductor 1100 are visible. FIG. 12 is a perspective view of leakage magnetic structure 1112 separated from the remainder of coupled inductor 1100, and FIG. 13 is a perspective view of coupling magnetic structure 1110 separated from the remainder of coupled inductor 1100.

Figure 14:
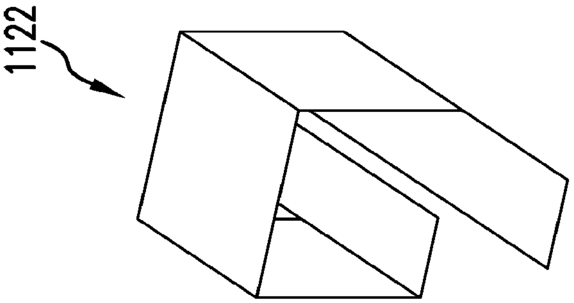
FIG. 14 is a perspective view of an instance of a winding of the FIG. 11 coupled inductor separated from the remainder of the coupled inductor.

Coupling magnetic structure 1110 is a ladder magnetic core including a first rail 1116, a second rail 1118, and a plurality of coupling teeth 1120. First rail 1116 is separated from second rail 1118 in the widthwise 1104 direction, and each coupling tooth 1120 is disposed between first rail 1116 and second rail 1118 in the widthwise 1104 direction. Although not required, it is anticipated that coupling magnetic structure 1110 will typically form one or more small gaps, such as in series with each coupling teeth 1120, to control magnetizing inductance of coupled inductor 1100. A respective winding 1122 forms one or more turns around each coupling tooth 1120. FIG. 14 is a perspective view of one instance of winding 1122 separated from the remainder of coupled inductor 1100. Coupling magnetic structure 1110 magnetically couples together windings 1122, and coupling magnetic structure 1110 is formed of a first magnetic material having a relatively high magnetic permeability, such as a ferrite material, to promote strong magnetic coupling of windings 1122.

Coupling teeth 1120 are disposed close together in the lengthwise 1102 direction, to promote small footprint of coupled inductor 1100 and strong magnetic coupling of windings 1122. Consequentially, leakage magnetic flux paths within coupling magnetic structure 1110 have minimal cross-sectional area. However, leakage magnetic structure 1112, which partially surrounds the top, left, and right sides of coupling magnetic structure 1110, provides a path having a relatively large cross-section for leakage magnetic flux between first rail 1116 and second rail 1118. Leakage magnetic structure 1112 is formed of a second magnetic material having a distributed gap, such as powder iron within a binder that is molded or disposed in multiple film layers. The second magnetic material forming leakage magnetic structure 1112 typically has a lower magnetic permeability than the first magnetic material forming coupling magnetic structure 1110, since it is typically desirable that magnetizing inductance of coupled inductor 1100 be significantly greater than leakage inductance of coupled inductor 1100. Desired leakage inductance values are achieved by varying the magnetic permeability of the second magnetic material and/or the cross-sectional area of leakage magnetic structure 1112, during the design of coupled inductor 1100.

Composite magnetic core 1108 does not have exposed air gaps, thereby helping minimize generation of fringing magnetic flux. Additionally, leakage magnetic structure 1112 serves as a shield, i.e., it separates windings 1122 from external components, thereby helping minimize capacitive coupling between windings 1122 and the external components.

The number of coupling teeth 1120 and associated windings 1122 may be varied without departing from the scope hereof. Additionally, the configuration of windings 1122, such as the number of turns formed by windings 1122 and/or the material forming windings 1122, may also be varied without departing from the scope hereof. Additionally, FIGS. 15-19 illustrate several possible variations of the composite magnetic core of coupled inductor 1100.

Figure 15:
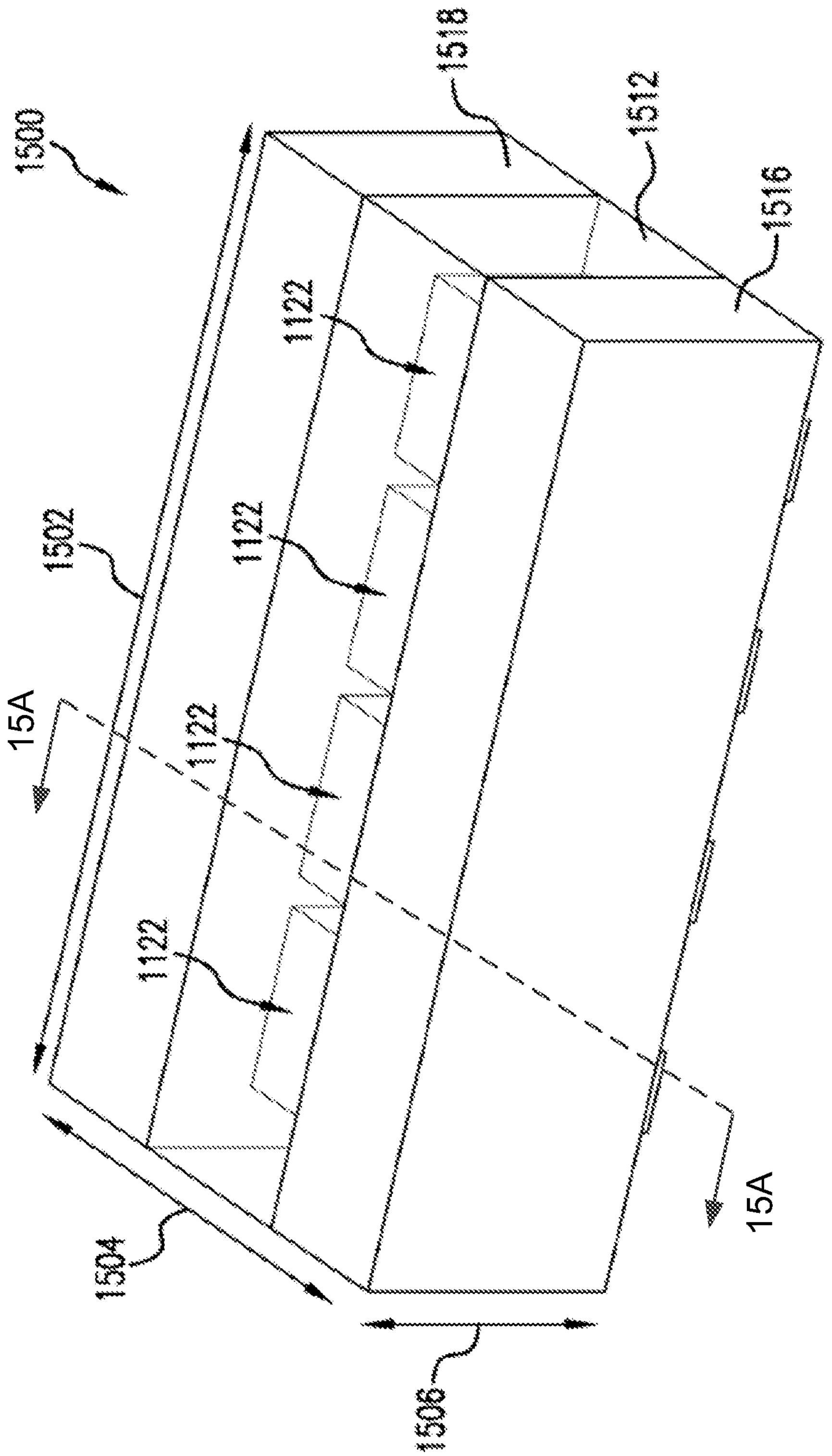
FIG. 15 is a perspective view of a coupled inductor for low electromagnetic interference with extended rails, according to an embodiment.
Figure 15A:
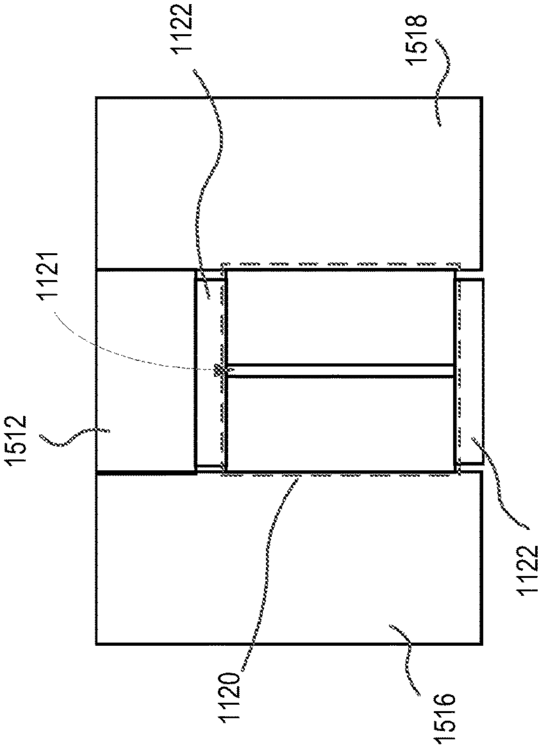
FIG. 15A is a cross-sectional view of the coupled inductor of FIG. 15.

In particular, FIG. 15 is a perspective view of a coupled inductor 1500 for low electromagnetic interference having a length 1502, a width 1504, and a height 1506. FIG. 15A is a cross-sectional view of the coupled inductor of FIG. 15. Coupled inductor 1500 is similar to coupled inductor 1100 of FIG. 11, in that it includes windings 1122 around coupling teeth 1120 (not visible). However, in the embodiment of FIG. 15, first and second rails 1116 and 1118 replaced with extended first and second rails 1516 and 1518, respectively. Leakage magnetic structure 1112 of FIG. 11 is also replaced with a leakage structure 1512, which is smaller in the widthwise 1504 direction than leakage magnetic structure 1112. Leakage magnetic structure 1512 is shown in wire view in FIG. 15 to show interior features of coupled inductor 1500.

FIG. 15A shows coupling tooth 1120 and winding 1122 between first rail 1516 and second rail 1518. Coupling tooth 1120 includes a gap 1121 to control magnetizing inductance as discussed above with respect to FIG. 11. In embodiments, coupling tooth may be formed in two equal halves as shown in FIG. 15A so that gap 1121 is in the center, but this is for purposes of illustration and gap 1121 may be positioned anywhere in series with coupling tooth 1120.

Figure 16:
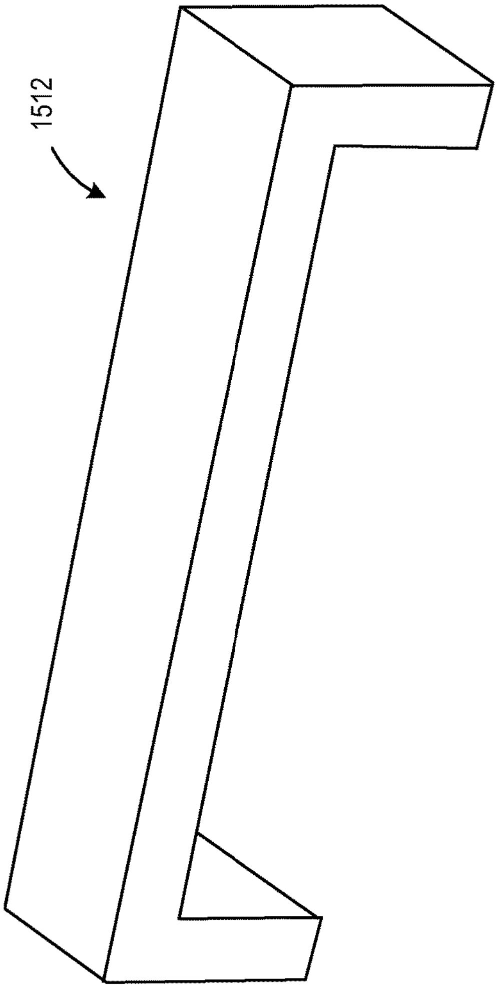
FIG. 16 a perspective view of a leakage magnetic structure of the FIG. 15 coupled inductor separated from the remainder of the coupled inductor.

FIG. 16 is a perspective view of leakage magnetic structure 1512 separated from the remainder of coupled inductor 1500. First and second rails 1516 and 1518 of FIG. 15 extend further in the height 1506 direction than first and second rails 1116 and 1118 of FIG. 11, such that a greater portion of leakage magnetic flux paths are occupied by high permeability magnetic material in the FIG. 15 embodiment than in the FIG. 11 embodiment. Consequently, coupled inductor 1500 of FIG. 15 will have greater leakage inductance values than coupled inductor 1100 of FIG. 11, assuming all else is equal. Additionally, first and second rails 1516 and 1518 partially bound leakage magnetic structure 1512 in the widthwise 1504 direction, which promotes mechanical robustness of coupled inductor 1500.

Figure 17:
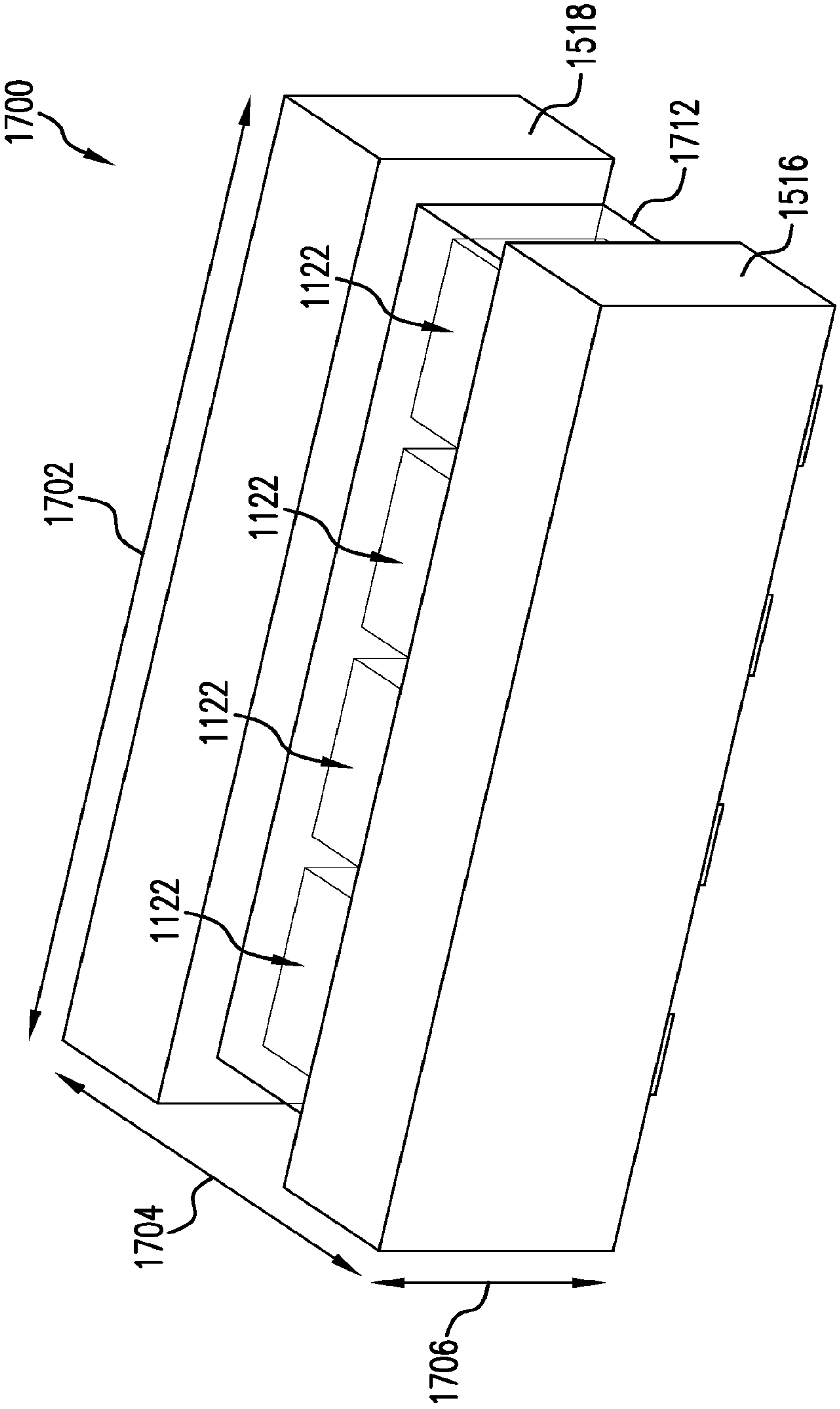
FIG. 17 is a perspective view of a coupled inductor for low electromagnetic interference with a coupling magnetic structure having a reduced cross-sectional area, according to an embodiment.

FIG. 17 is a perspective view of a coupled inductor 1700 for low electromagnetic interference having a length 1702, a width 1704, and a height 1706. Coupled inductor 1700 is like coupled inductor 1500 of FIG. 15, but with leakage magnetic structure 1512 replaced with leakage magnetic structure 1712. Leakage magnetic structure 1712 is shown in wire view in FIG. 17 to show interior portions of coupled inductor 1700. Leakage magnetic structure 1712 of FIG. 17 has a smaller cross-sectional area in a plane of the lengthwise 1702 and height 1706 directions than leakage magnetic structure 1512 of FIG. 15. As a result, coupled inductor 1700 will have smaller leakage inductance values than coupled inductor 1500, assuming all else is equal. Leakage magnetic structure 1712 is shown in wire view in FIG. 17 to show interior features of coupled inductor 1700.

Figure 18:
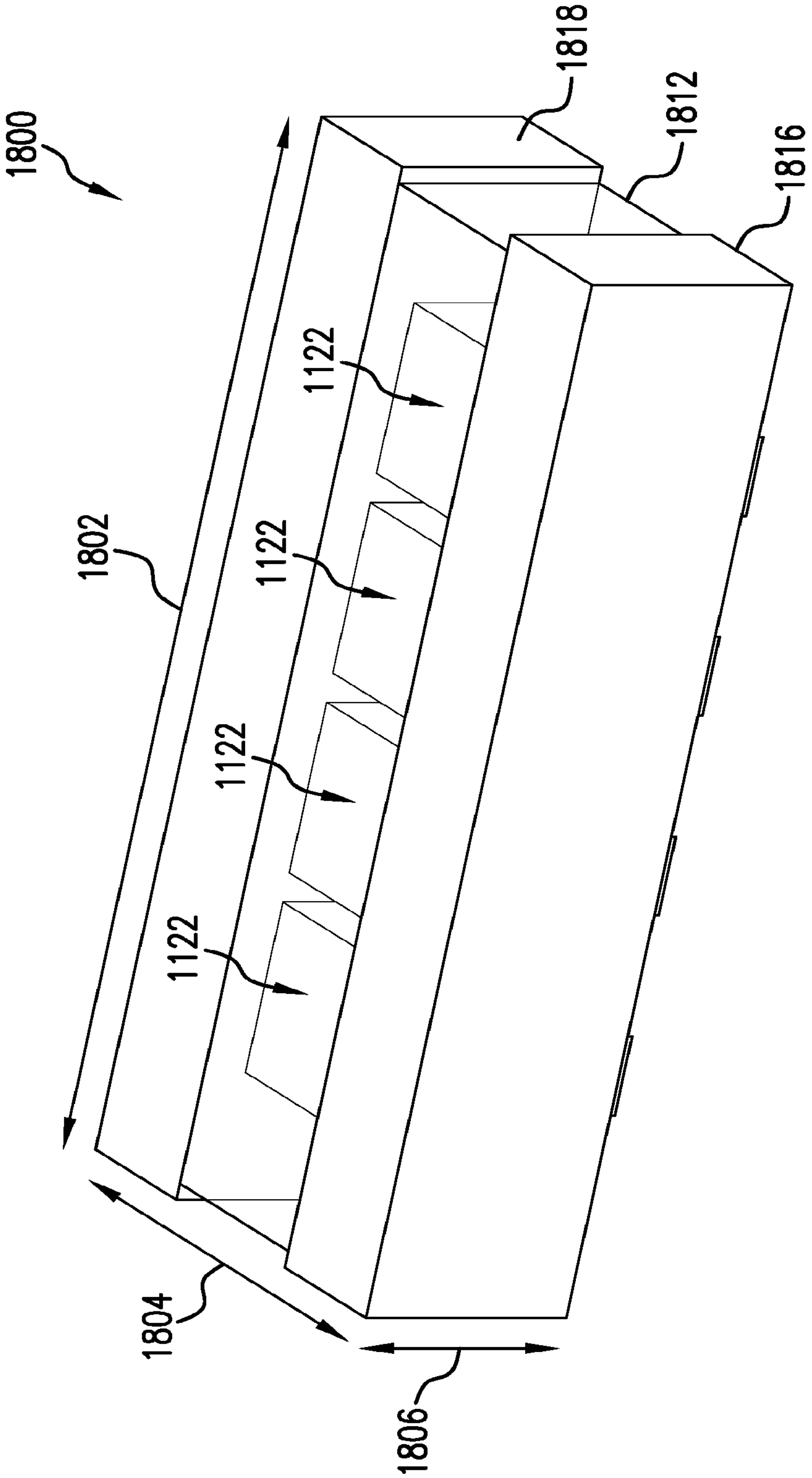
FIG. 18 is a perspective view of a coupled inductor for low electromagnetic interference with a coupling magnetic structure having a non-uniform cross-sectional area, according to an embodiment.
Figure 19:
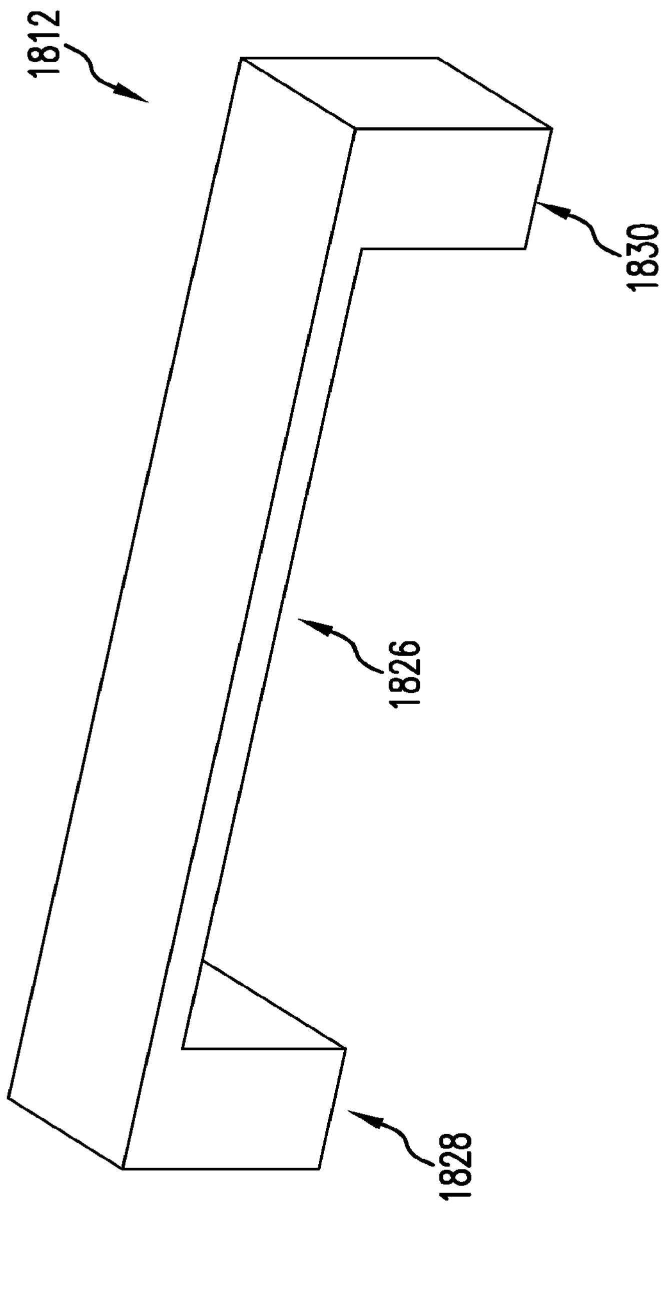
FIG. 19 a perspective view of a leakage magnetic structure of the FIG. 18 coupled inductor separated from the remainder of the coupled inductor.

FIG. 18 is a perspective view of a coupled inductor 1800 having a length 1802, a width 1804, and a height 1806. Coupled inductor 1800 is like coupled inductor 1500 of FIG. 15, but with leakage magnetic structure 1512 replaced with leakage magnetic structure 1812. First and second rails 1516 and 1518 are also replaced with first and second rails 1816 and 1818 to correspond to leakage magnetic structure 1812. Leakage magnetic structure 1812 is shown in wire view in FIG. 18 to show interior features of coupled inductor 1800, and FIG. 19 is a perspective view of leakage magnetic structure 1812 separated from the remainder of coupled inductor 1800. Leakage magnetic structure 1812 has a non-uniform cross-sectional area in a plane of the lengthwise 1802 and height 1806 directions. In particular, leakage magnetic structure 1812 has a relatively small cross-sectional area in a top region 1826 above coupling teeth 1120, and leakage magnetic structure 1812 has a relatively large cross-sectional area at end regions 1828 and 1830 of coupled inductor 1800 (see FIG. 19). Consequently, leakage magnetic flux flows through leakage magnetic structure 1812 primarily at end regions 1828 and 1830, and leakage inductance values can be adjusted during the design of coupled inductor 1800, for example, by varying cross-sectional area of end regions 1828 and 1830. Top region 1826 of magnetic structure 1812 primarily serves as a shield, i.e., it separates windings 1122 from external components. However, top region 1826 also provides a relatively high-reluctance path for leakage magnetic flux through leakage magnetic structure 1812.

Figure 20:
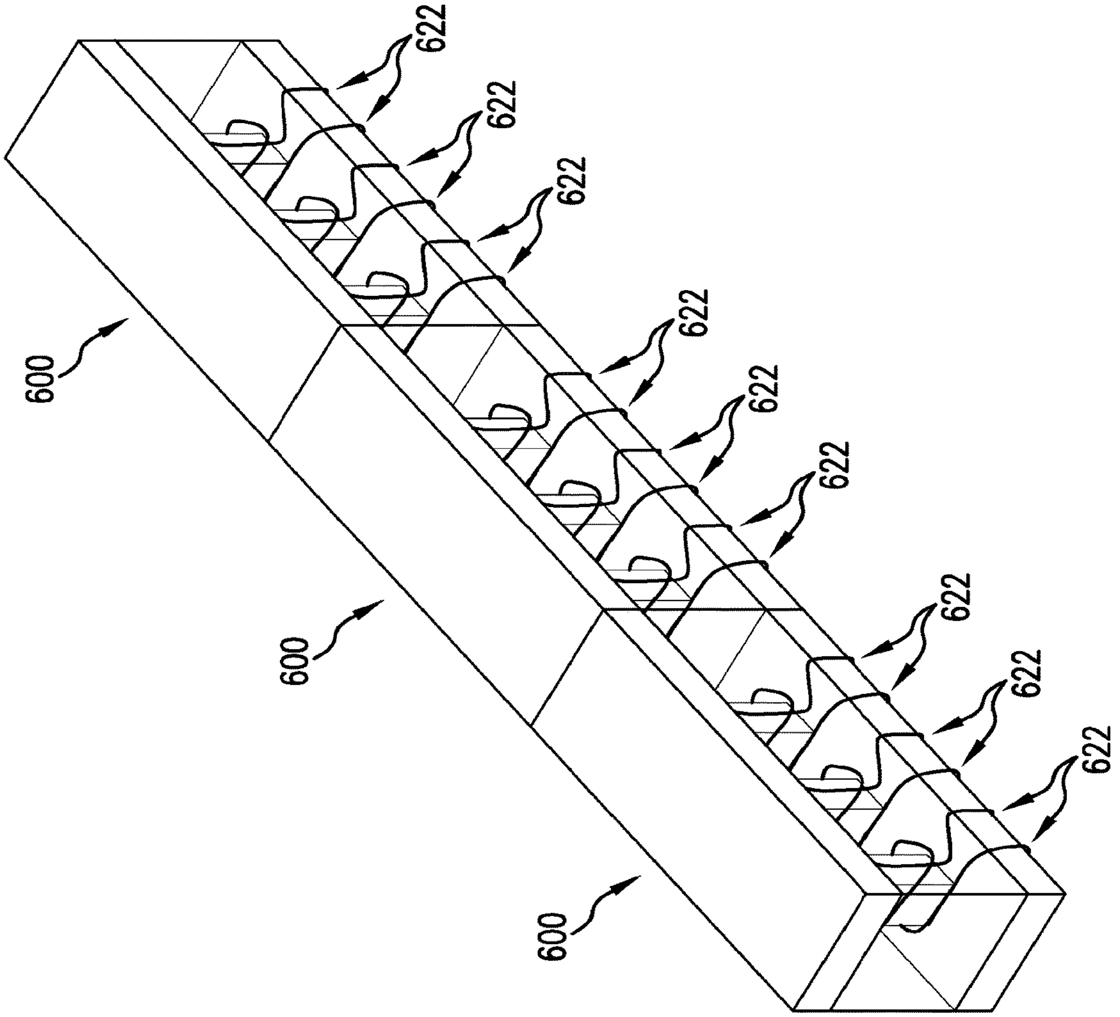
FIG. 20 is a perspective view of three instances of the FIG. 6 coupled inductor joined together to effectively create a single coupled inductor having nine windings, according to an embodiment.

In certain embodiments of the coupled inductors discussed above, the coupling magnetic structure extends to an outer surface of the coupled inductor. Multiple instances of these embodiments can be joined together to effectively form a single coupled inductor having a large number of windings. For example, FIG. 20 illustrates three instances of coupled inductor 600 of FIG. 6 joined together to effectively form a single coupled inductor having nine windings 622. As known in the art, a large number of phases promotes ripple current cancelation and fast transient response in multiphase switching power converter applications. However, it can be impractical to manufacture coupled inductors having a large number of windings. Joining together multiple instances of the present coupled inductors advantageously enables a large number of windings to be realized without requiring manufacturing of a coupled inductor have a large number of windings.

The coupled inductors discussed above have "ladder" style coupling magnetic structures which advantageously can be scaled to accommodate any desired number of windings. However, the concepts disclosed herein can also be used with other configurations of coupling magnetic structures.

Figure 21:
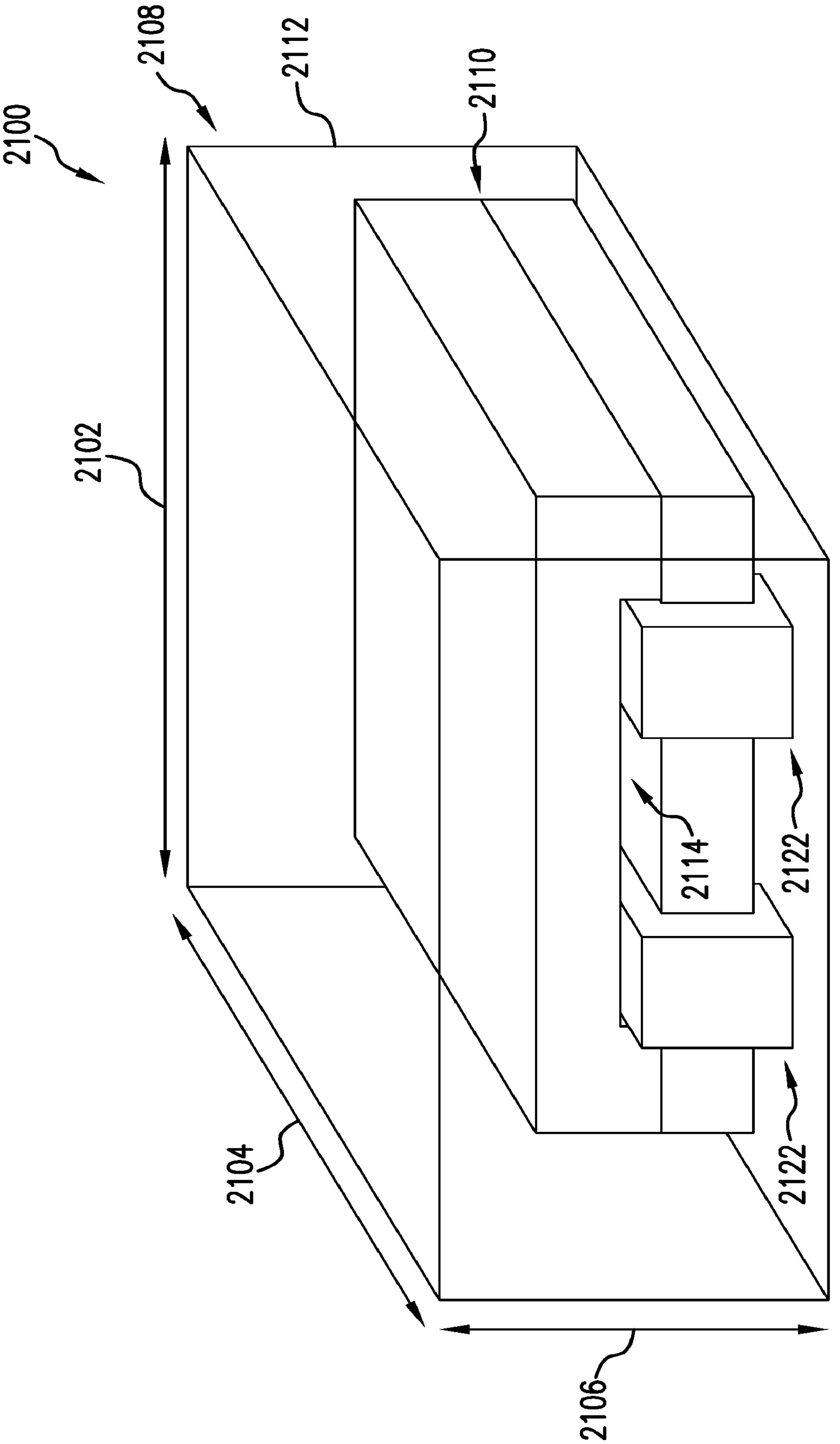
FIG. 21 is a perspective view of a coupled inductor for low electromagnetic interference including two windings, according to an embodiment.

For example, FIG. 21 is a perspective view of a coupled inductor 2100 for low electromagnetic interference having a length 2102, a width 2104, and a height 2106. Coupled inductor 2100 includes a composite magnetic core 2108 including a coupling magnetic structure 2110 embedded in a leakage magnetic structure 2112. Leakage magnetic structure 2112 is shown in wire view in FIG. 21. Coupling magnetic structure 2110 forms a passageway 2114 in the widthwise 2104 direction, and two windings 2122 extend through passageway 2114 in the widthwise 2104 direction. Coupling magnetic structure 2110 is formed of first magnetic material having a relatively high magnetic permeability, such as a ferrite material, to promote strong magnetic coupling of windings 2122.

Leakage magnetic structure 2112 is formed of a second magnetic material having a distributed gap, such as powder iron within a binder that is molded or disposed in multiple film layers. The second magnetic material forming leakage magnetic structure 2112 typically has a lower magnetic permeability than the first magnetic material forming coupling magnetic structure 2110, since it is typically desirable that magnetizing inductance of coupled inductor 2100 be significantly greater than leakage inductance of coupled inductor 2100. Desired leakage inductance values may be achieved by varying the magnetic permeability of the second magnetic material, the cross-sectional area of leakage magnetic structure 2112, and/or the configuration of passageway 2114, during the design of coupled inductor 2100.

Composite magnetic core 2108 does not have exposed air gaps, thereby helping minimize generation of fringing magnetic flux. Additionally, coupling magnetic structure 2112 serves as a shield, i.e., it separates windings 2122 from external components, thereby helping minimize capacitive coupling between windings 2122 and external components.

As discussed above, leakage inductance values can be adjusted in the present embodiments by varying the magnetic permeability of magnetic material forming the leakage magnetic structure, and/or by varying the cross-sectional area of the leakage magnetic structure. Additionally, leakage inductance values can be reduced by embedding magnetic flux impeding structures within the leakage magnetic structure. These magnetic flux impeding structures have a lower magnetic permeability than magnetic material forming the leakage magnetic structure, and therefore, the magnetic flux impeding structures impede flow of leakage magnetic flux. The magnetic flux impeding structures are optionally formed of non-conductive material to prevent Eddy currents from circulating therein. It is desirable that the magnetic flux impeding structures do not extend to an outer surface of the leakage magnetic structure to prevent generation of fringing magnetic flux.

Figure 22:
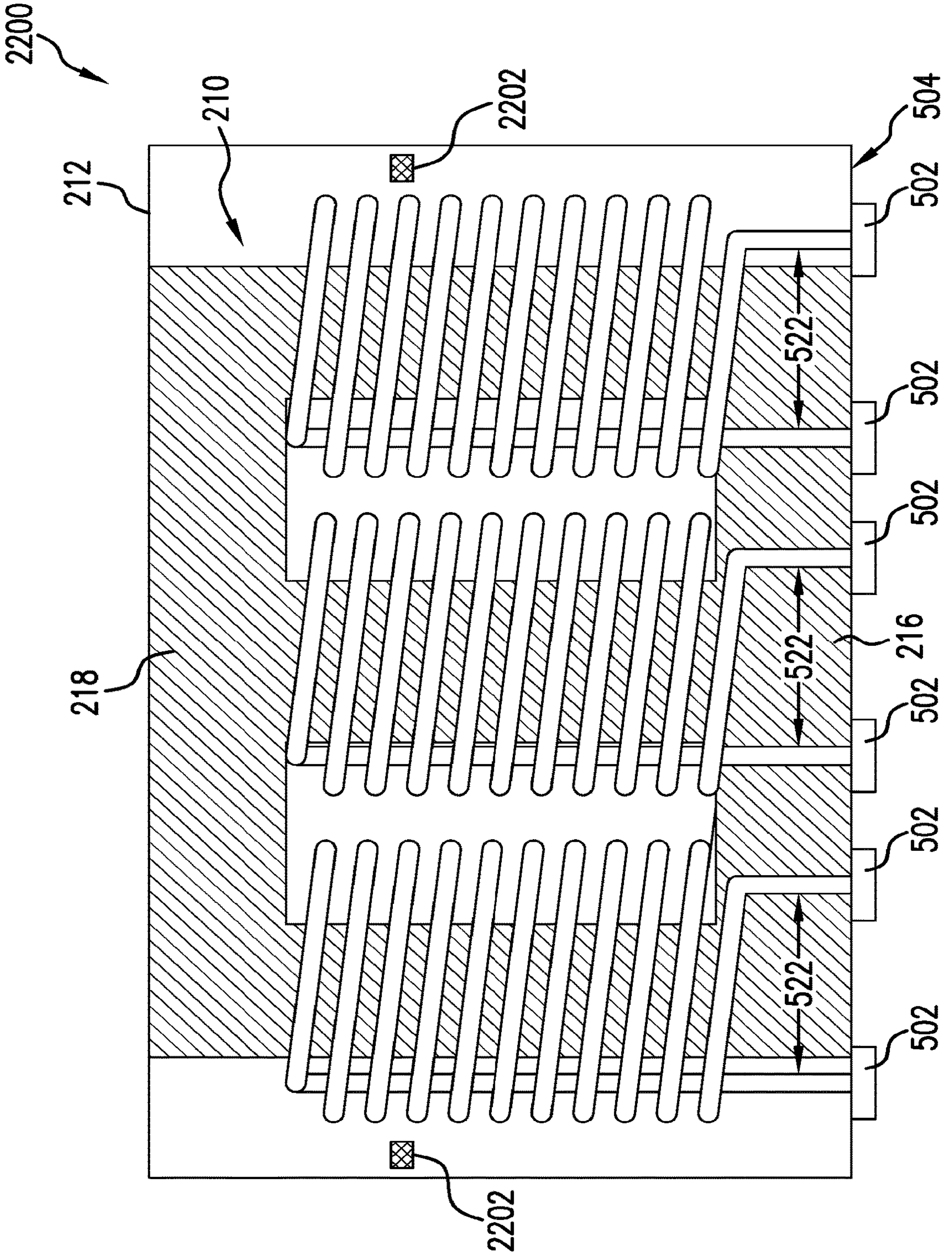
FIG. 22 is a perspective view of a coupled inductor for low electromagnetic interference including magnetic flux impeding structures embedded in a leakage magnetic structure.

FIG. 22 illustrates one example of how magnetic flux impeding structures can be used in the present embodiments. In particular, FIG. 22 is a side elevational view of a coupled inductor 2200 for low electromagnetic interference which is similar to coupled inductor 500 of FIG. 5, but further including magnetic flux impeding structures 2202 embedded in leakage magnetic structure 212. Magnetic flux impeding structures 2202 impede flow of leakage magnetic flux through leakage magnetic structure 212, thereby reducing leakage inductance values of windings 522.

The leakage magnetic structures disclosed herein are optionally formed using one of a "cold pressing" method or a "hot pressing" method. Cold pressing includes pressing magnetic material together at ambient temperature and at high pressure to cure and mold the magnetic material. The high pressure pushes magnetic particles close together, and therefore, cold pressing can obtain relatively high magnetic permeability. However, cold pressing also asserts significant pressure on windings within the magnetic material, thereby requiring care to avoid damage to the windings, particularly in embodiments where the windings include dielectric insulation.

Hot pressing, on the other hand, includes curing magnetic material at an elevated temperature without significant pressure. A relatively large amount of binder is required to compensate for the lack of pressure, and the binder limits concentration of magnetic particles. As a result, hot pressing typically cannot achieve as high of magnetic permeability as cold pressing. However, the leakage magnetic structures of the present embodiments may not require high magnetic permeability since it is often desired that leakage inductance values be relatively low, to ensure that magnetizing inductance is greater than leakage inductance. Additionally, the lack of pressure reduces likelihood of winding damage when forming the leakage magnetic structures. Therefore, it may be preferable to use hot pressing over cold pressing when forming leakage magnetic structures.

Applicant has also determined that low electromagnetic interference can be obtained in a coupled inductor by placing a metal shield over a gap in a leakage magnetic flux path of the magnetic core, or over any other source of an alternating current (AC) magnetic field in the coupled inductor. Any AC magnetic field in vicinity of the metal shield generates circulating Eddy currents in the metal shield which oppose the AC magnetic field, thereby helping minimize possibility of electromagnetic interference from the AC magnetic field. The metal shield may be cheaper and simpler than a composite magnetic core, and the metal shield may help conduct heat away from the coupled inductor. However, Eddy currents circulating in the metal shield may dissipate significant power during coupled inductor operation.

Figure 23:
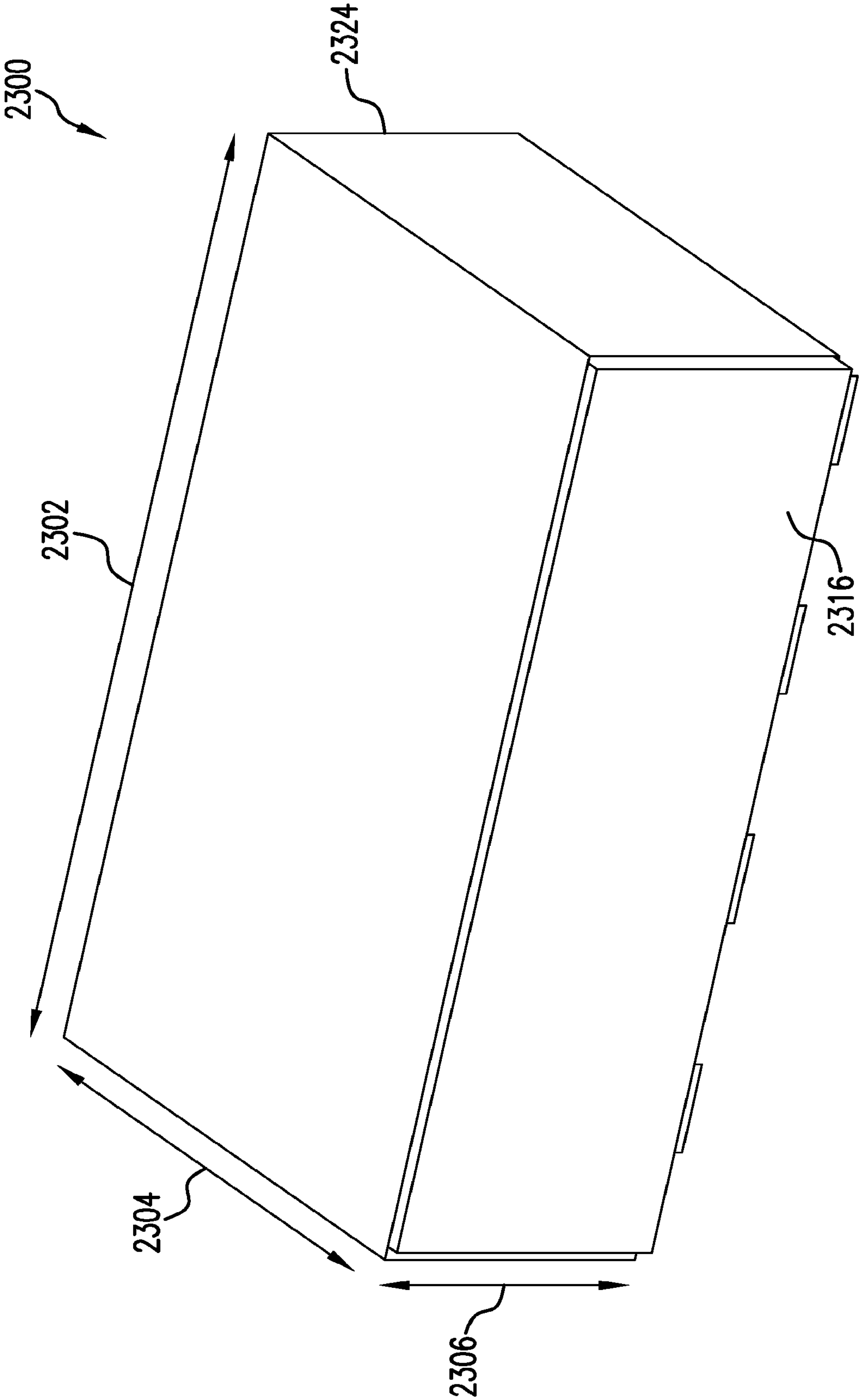
FIG. 23 is a perspective view of a coupled inductor for low electromagnetic interference including a metal shield, according to an embodiment.
Figure 24:
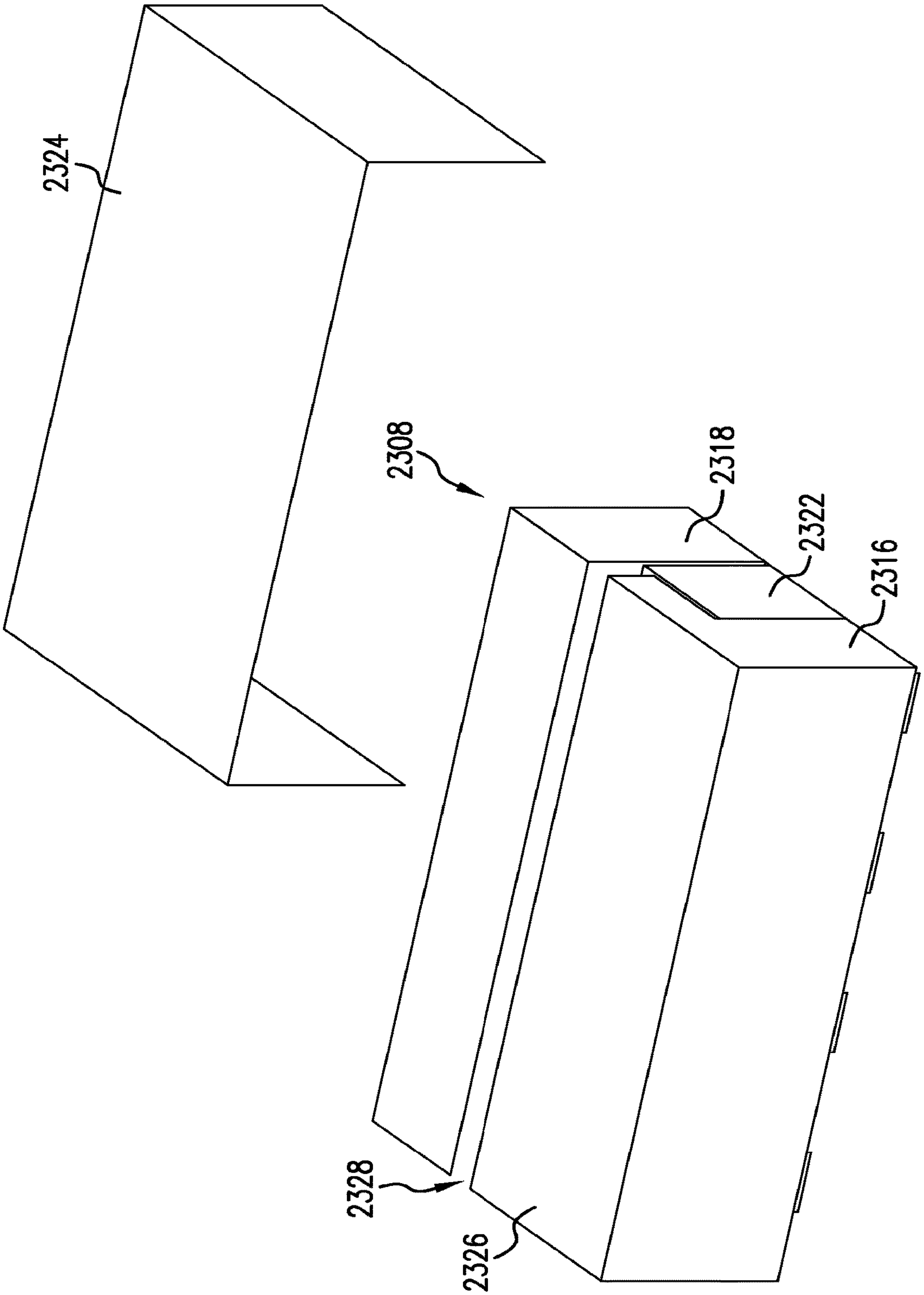
FIG. 24 is an exploded perspective view of the FIG. 23 coupled inductor with the metal shield separated from the remainder of the coupled inductor.
Figure 25:
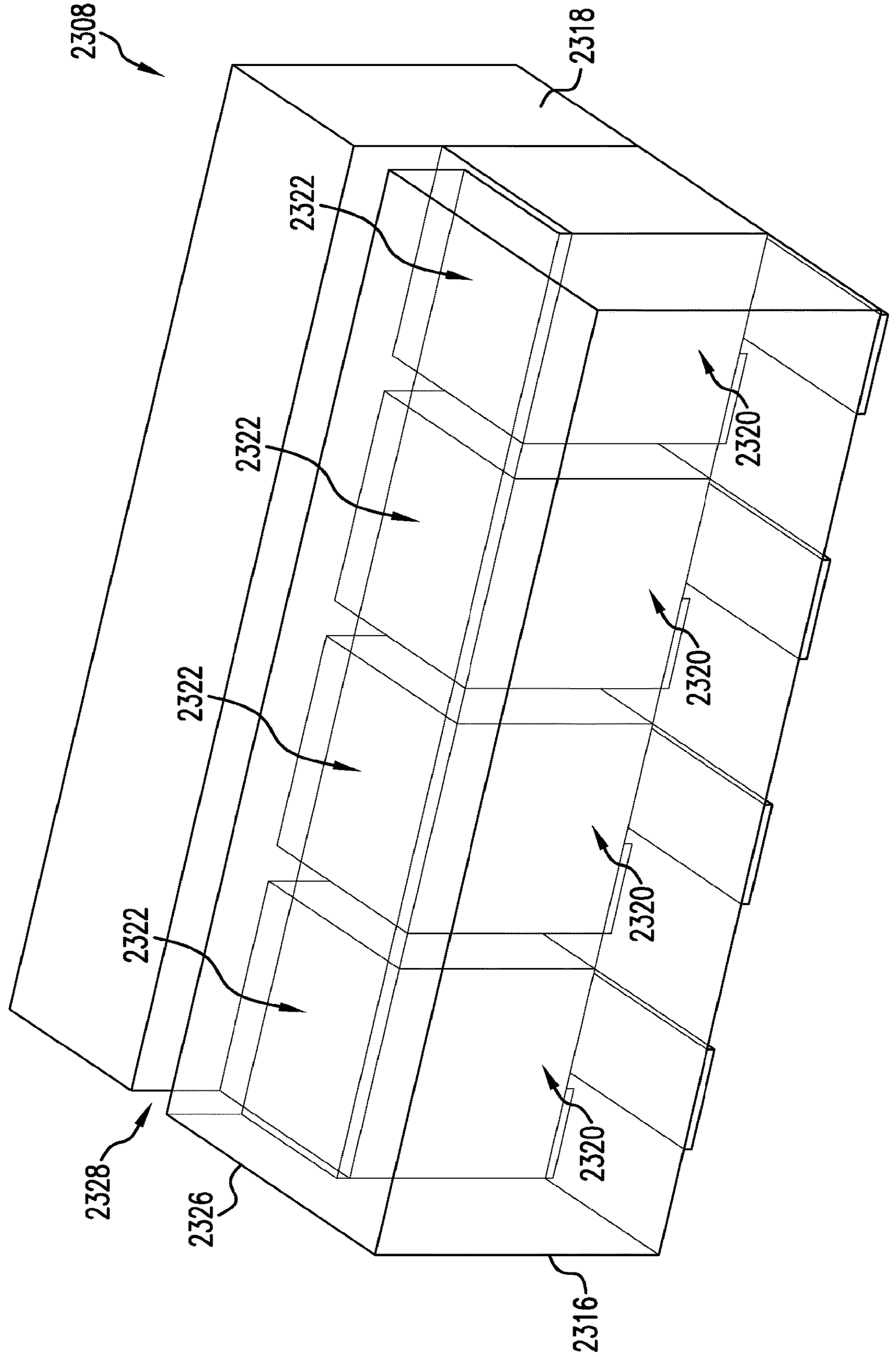
FIG. 25 is perspective view of the FIG. 23 coupled inductor with the metal shield omitted, as well as a first rail and a leakage plate shown in wire view, to show interior features of the coupled inductor.

FIGS. 23-25 illustrate one example of a coupled inductor for low electromagnetic interference including a metal shield instead of a composite magnetic core. In particular, FIG. 23 is a perspective view of a coupled inductor 2300 for low magnetic interference having a length 2302, a width 2304, and a height 2306. Coupled inductor 2300 includes a metal shield 2324 covering top, left, and right sides of the coupled inductor. FIG. 24 is an exploded perspective view of coupled inductor 2300 with metal shield 2324 separated from the remainder of the coupled inductor. Coupled inductor 2300 further includes a ladder magnetic core 2308 including first and second rails 2316 and 2318 separated from each other in the widthwise 2304 direction, as well as plurality of coupling teeth 2320 disposed between first rail 2316 and second rail 2318 in the widthwise 2304 direction (see FIG. 25). A respective winding 2322 is wound around each coupling tooth 2320, and magnetic core 2308 magnetically couples together windings 2322. In some embodiments, windings 2322 are similar to winding 1122 of FIG. 14. Magnetic core 2308 further includes a leakage plate 2326 bridging first rail 2316 and second rail 2318 in the widthwise 2304 direction. Leakage plate 2326 forms a gap 2328 to provide for energy storage and help prevent magnetic saturation of coupled inductor 2300. Metal shield 2324 covers gap 2328 and thereby helps prevent fringing magnetic flux generated by gap 2328 from coupling to external components. FIG. 25 is perspective view of coupled inductor 2300 with metal shield 2324 omitted, as well as with first rail 2316 and leakage plate 2326 shown in wire view, to show interior features of coupled inductor 2300. Magnetic core 2308 is formed, for example, of high-permeability magnetic material, such as a ferrite material.

Figure 26:
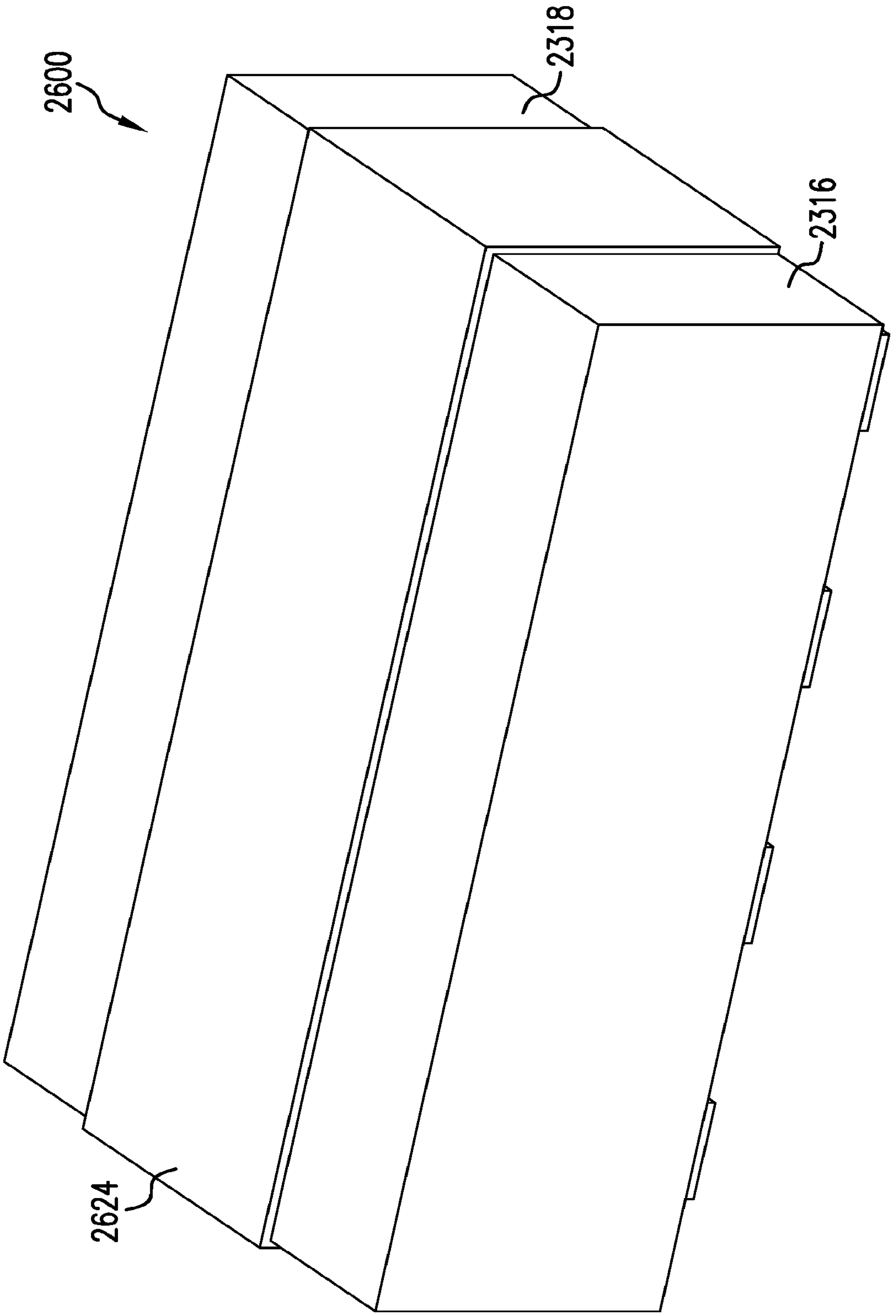
FIG. 26 is a perspective view of another coupled inductor for low electromagnetic interference including a metal shield, according to an embodiment.

The number of coupling teeth 2320 and respective windings 2322, as well the configuration of windings 2322, may be varied without departing from the scope hereof. Additionally, metal shield 2324 may be modified as long as it at least substantially covers gap 2328. For example, FIG. 26 is a perspective view of a coupled inductor 2600 for low magnetic interference like coupled inductor 2300 of FIG. 23, but where a metal shield 2624 covers only portions of magnetic core 2308 in the vicinity of gap 2328 (not visible in FIG. 26).

Figure 27:
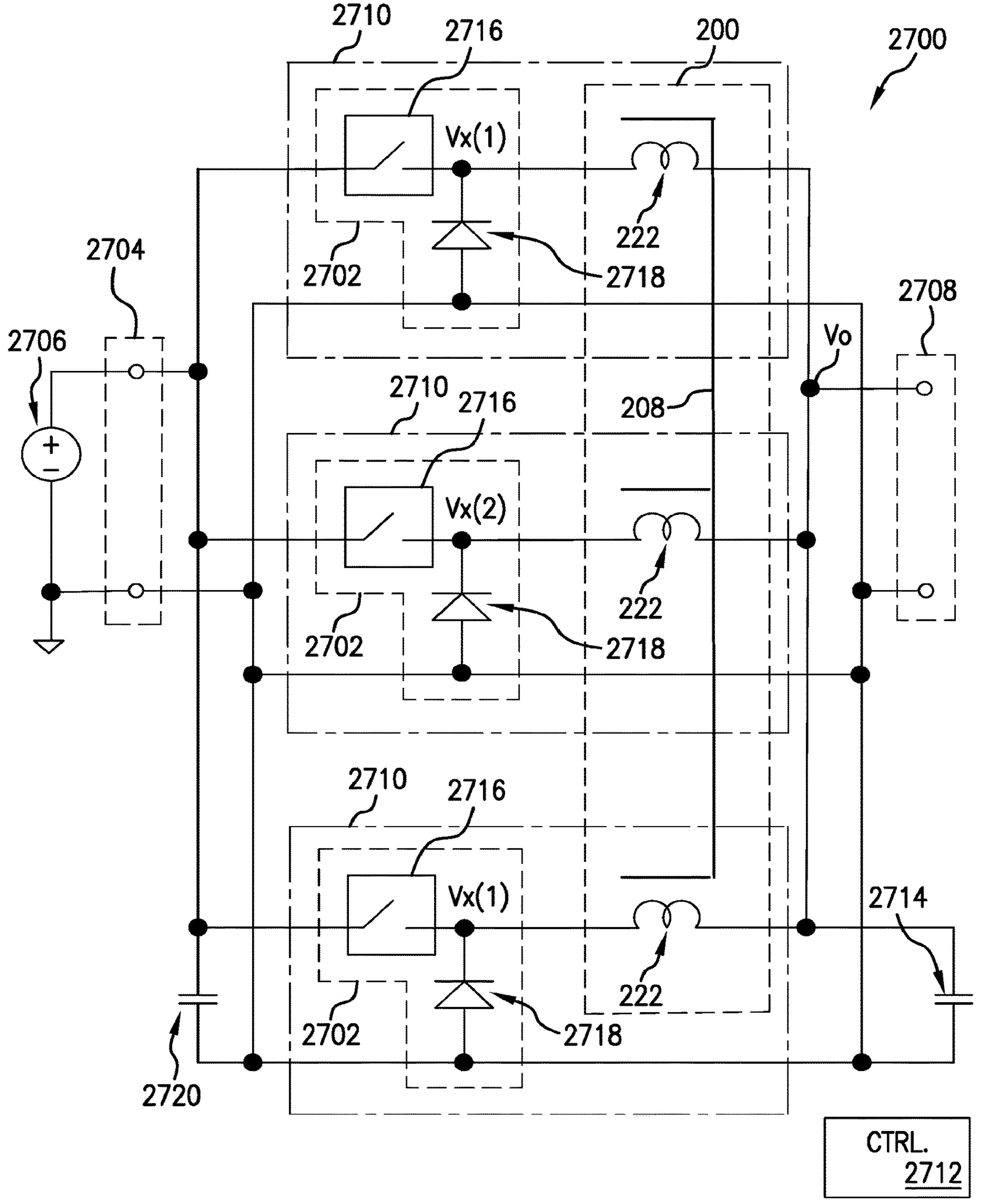
FIG. 27 illustrates a multi-phase buck switching power converter including an instance of the FIG. 2 coupled inductor, according to an embodiment.

One possible application of the coupled inductors for low electromagnetic interference disclosed herein is in multi-phase switching power converter applications, including but not limited to, multi-phase buck converter applications, multi-phase boost converter applications, or multi-phase buck-boost converter applications. For example, FIG. 27 illustrates one possible use of coupled inductor 200 (FIG. 2) in a multi-phase buck converter 2700. Each winding 222 is electrically coupled between a respective switching node $V_x$ and a common output node $V_o$. A respective switching circuit 2702 is electrically coupled to each switching node $V_x$. Each switching circuit 2702 is electrically coupled to an input port 2704, which is in turn electrically coupled to an electric power source 2706. An output port 2708 is electrically coupled to output node $V_o$. Each switching circuit 2702 and respective inductor is collectively referred to as a "phase" 2710 of the converter. Thus, multi-phase buck converter 2700 is a three-phase converter.

A controller 2712 causes each switching circuit 2702 to repeatedly switch its respective winding end between electric power source 2706 and ground, thereby switching its winding end between two different voltage levels, to transfer power from electric power source 2706 to a load (not shown) electrically coupled across output port 2708. Controller 2712 typically causes switching circuits 2702 to switch at a relatively high frequency, such as at 100 kilohertz or greater, to promote low ripple current magnitude and fast transient response, as well as to ensure that switching induced noise is at a frequency above that perceivable by humans. Additionally, in certain embodiments, controller 2712 causes switching circuits 2702 to switch out-of-phase with respect to each other in the time domain to improve transient response and promote ripple current cancelation in output capacitors 2714.

Each switching circuit 2702 includes a control switching device 2716 that alternately switches between its conductive and non-conductive states under the command of controller 2712. Each switching circuit 2702 further includes a free-wheeling device 2718 adapted to provide a path for current through its respective winding 222 when the control switching device 2716 of the switching circuit transitions from its conductive to non-conductive state. Freewheeling devices 2718 may be diodes, as shown, to promote system simplicity. However, in certain alternate embodiments, freewheeling devices 2718 may be supplemented by or replaced with a switching device operating under the command of controller 2712 to improve converter performance. For example, diodes in freewheeling devices 2718 may be supplemented by switching devices to reduce freewheeling device 2718 forward voltage drop. In the context of this disclosure, a switching device includes, but is not limited to, a bipolar junction transistor, a field effect transistor (e.g., a N-channel or P-channel metal oxide semiconductor field effect transistor, a junction field effect transistor, a metal semiconductor field effect transistor), an insulated gate bipolar junction transistor, a thyristor, or a silicon controlled rectifier.

Controller 2712 is optionally configured to control switching circuits 2702 to regulate one or more parameters of multi-phase buck converter 2700, such as input voltage, input current, input power, output voltage, output current, or output power. Buck converter 2700 typically includes one or more input capacitors 2720 electrically coupled across input port 2704 for providing a ripple component of switching circuit 2702 input current. Additionally, one or more output capacitors 2714 are generally electrically coupled across output port 2708 to shunt ripple current generated by switching circuits 2702.

Buck converter 2700 could be modified to have a different number of phases. For example, converter 2700 could be modified to have four phases and use coupled inductor 1100 of FIG. 11. Buck converter 2700 could also be modified to use one of the other coupled inductors disclosed herein, such as coupled inductor 400, 500, 600, 800, 1500, 1700, 1800, 2100, 2200, 2300, 2600, 2800 (discussed below), 3500 (discussed below), or 3800 (discussed below). Additionally, buck converter 2700 could also be modified to have a different multi-phase switching power converter topology, such as that of a multi-phase boost converter or a multi-phase buck-boost converter, or an isolated topology, such as a flyback or forward converter without departing from the scope hereof.

Figure 28:
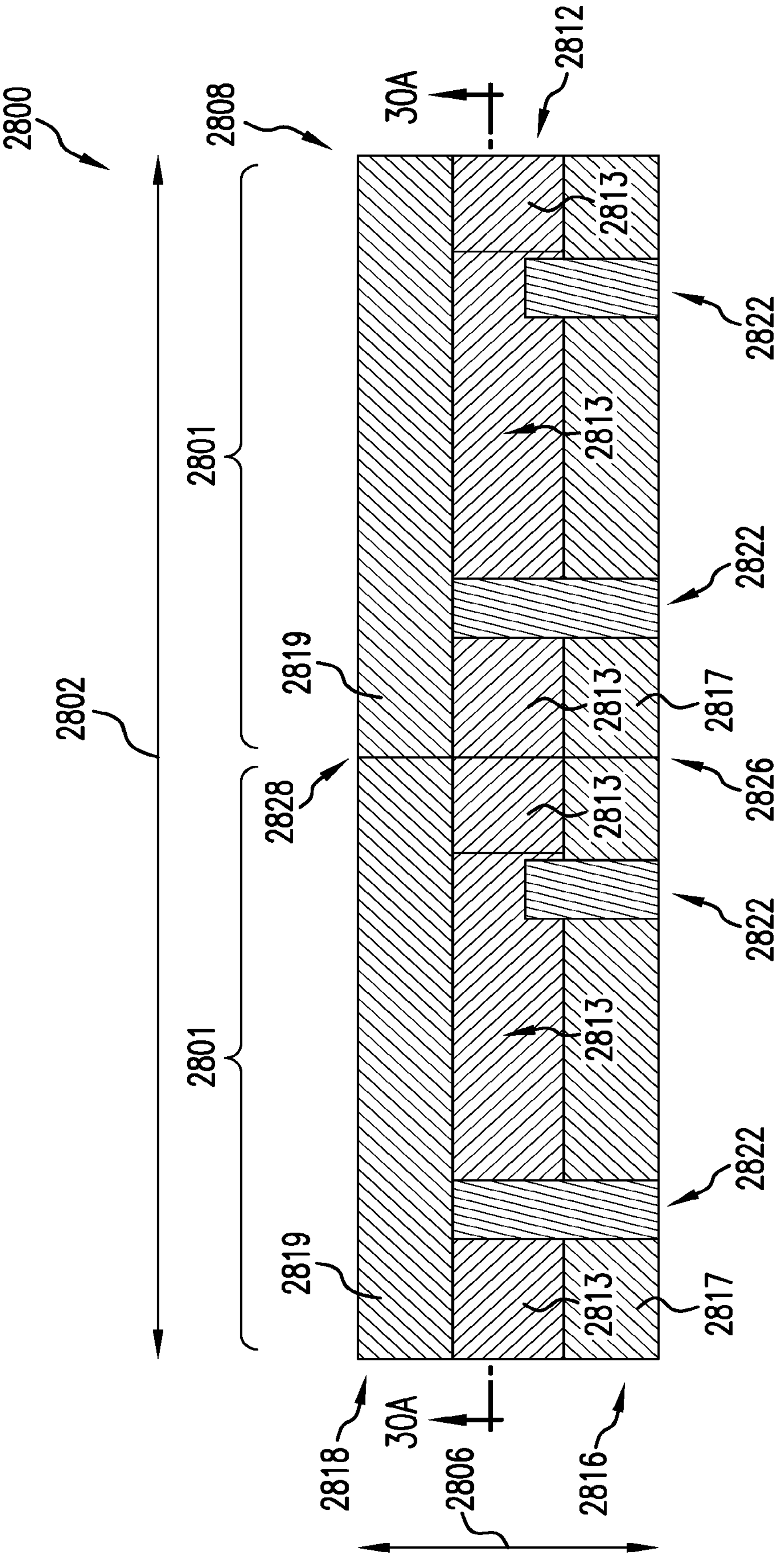
FIG. 28 is a front elevational view of a coupled inductor for low electromagnetic interference including two drum core discrete inductors and a leakage magnetic structure, according to an embodiment.
Figure 29:
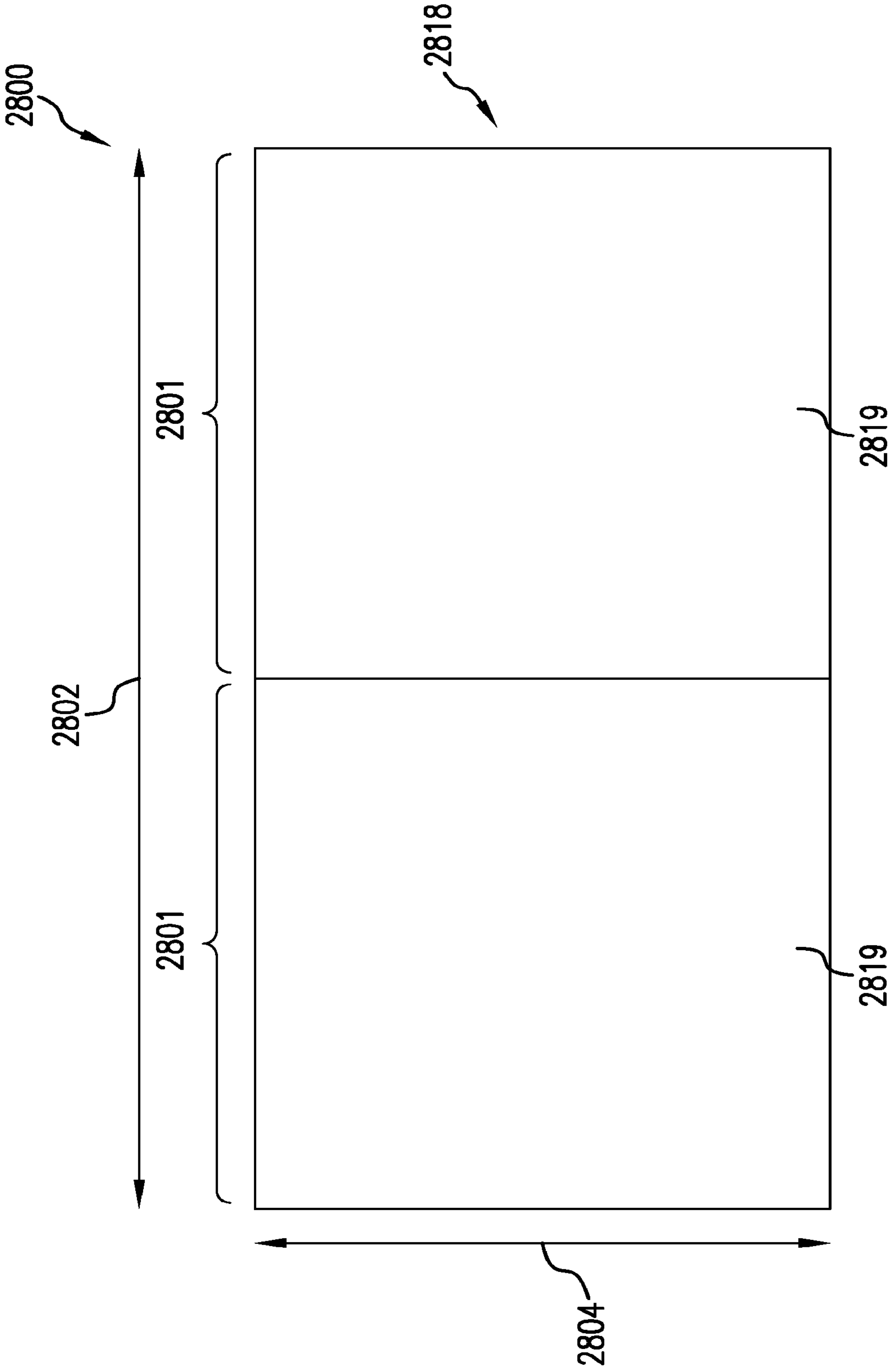
FIG. 29 is a top plan view of the FIG. 28 coupled inductor.
Figure 30:
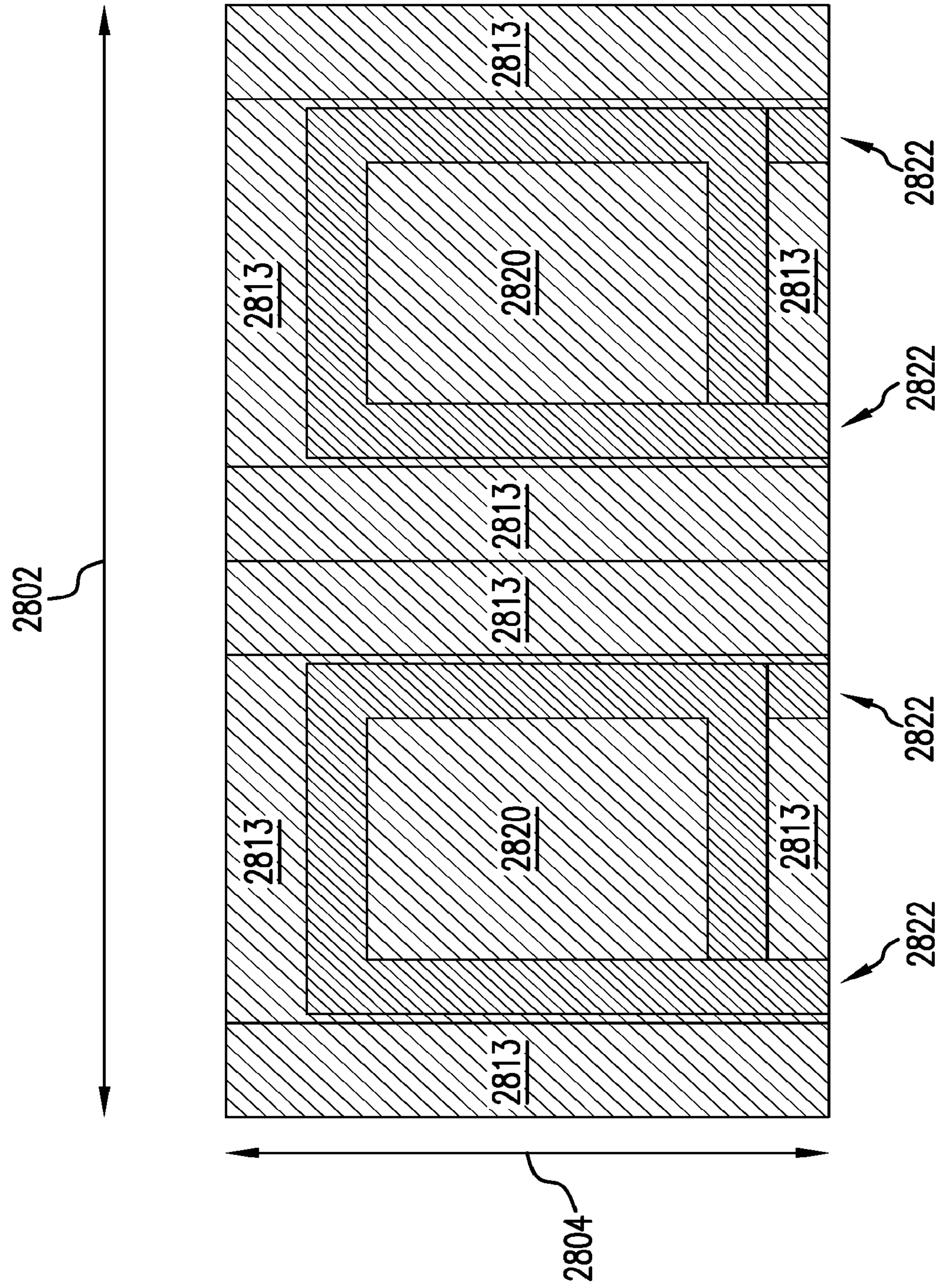
FIG. 30 is a cross-sectional view of the FIG. 28 coupled inductor taken along line 30A-30A of FIG. 28.
Figure 31:
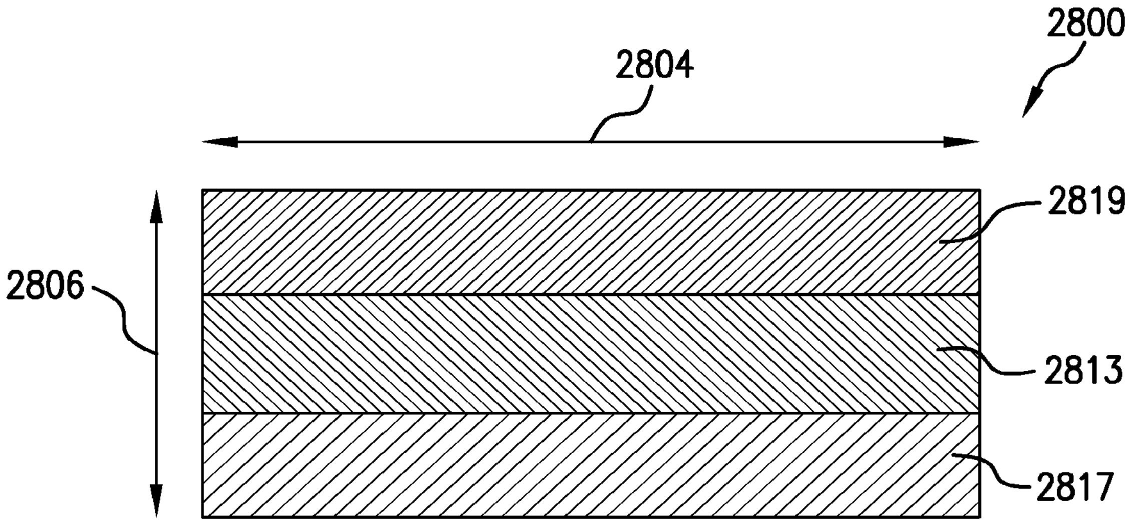
FIG. 31 is a side elevational view of the FIG. 28 coupled inductor.
Figure 32:
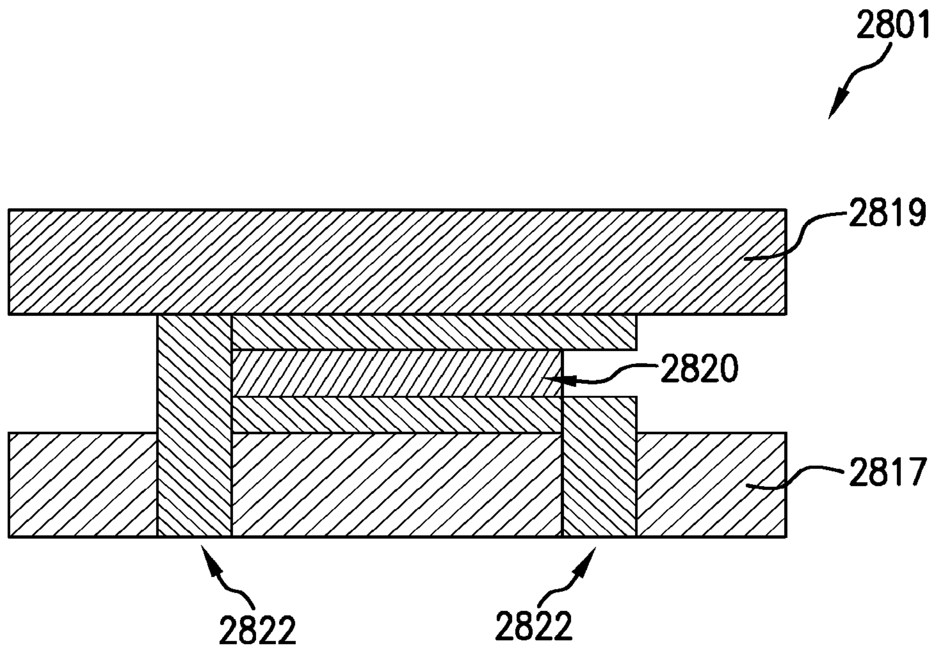
FIG. 32 is a front elevational view of one drum core discrete inductor instance separated from the remainder of the FIG. 28 coupled inductor.

Applicant has additionally determined that multiple discrete inductors, such as multiple drum core discrete inductors, can be used with leakage magnetic structures to form a coupled inductor for low electromagnetic interference. For example, FIG. 28 is a front elevational view of a coupled inductor 2800 for low electromagnetic interference including two drum discrete core inductors 2801 and a leakage magnetic structure 2812. Coupled inductor 2800 has a length 2802, a width 2804, and a height 2806. FIG. 29 is a top plan view of coupled inductor 2800, FIG. 30 is a cross-sectional view of coupled inductor 2800 taken along line 30A-30A of FIG. 28, FIG. 31 is a side elevational view coupled inductor 2800, and FIG. 32 is a front elevational view of one drum core discrete inductor 2801 instance separated from the remainder of coupled inductor 2800.

Figure 33:
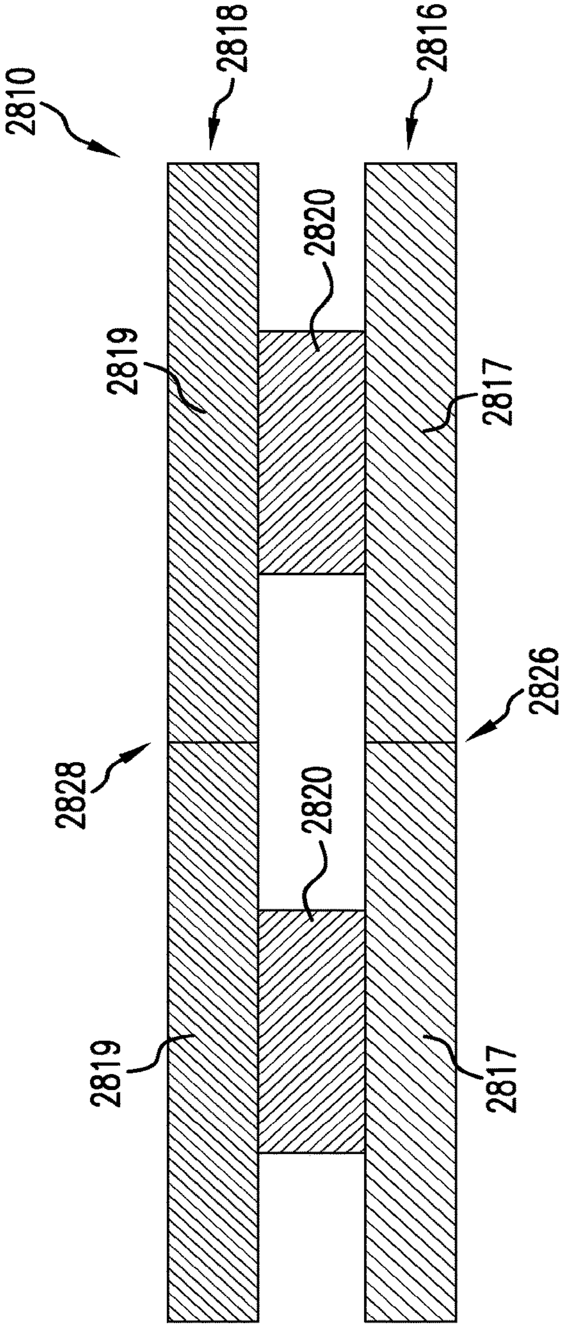
FIG. 33 is a front elevational view of a coupling magnetic structure of the FIG. 28 coupled inductor separated from the remainder of the FIG. 28 coupled inductor.
Figure 34:
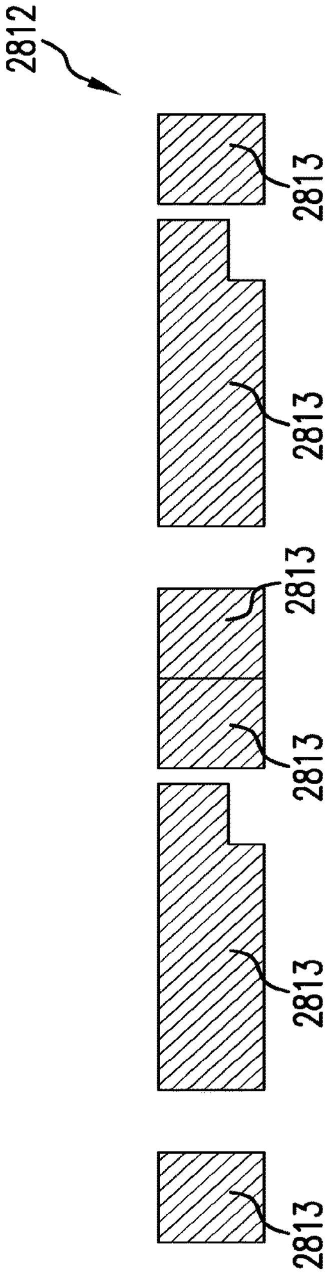
FIG. 34 is a front elevational view of a leakage magnetic structure of the FIG. 28 coupled inductor separated from the remainder of the FIG. 28 coupled inductor.

Drum core discrete inductors 2801 are joined in the lengthwise 2802 rejection. Leakage magnetic structure 2812 and several elements of drum core discrete inductors 2801 collectively form a composite magnetic core 2808 including a coupling magnetic structure 2810 and leakage magnetic structure 2812. FIG. 33 is a front elevational view of coupling magnetic structure 2810 separated from the remainder of coupled inductor 2800, and FIG. 34 is a front elevational view of leakage magnetic structure 2812 separated from the remainder of coupled inductor 2800. Coupling magnetic structure 2810, which is formed from elements of both instances of drum core discrete inductor 2801, is a ladder magnetic core including a first rail 2816, a second rail 2818, and a plurality of coupling teeth 2820. First rail 2816 is separated from second rail 2818 in the height 2806 direction, and each coupling tooth 2820 is disposed between first rail 2816 and second rail 2818 in the height 2806 direction. First rail 2816 includes a plurality of first rail subsections 2817 disposed in a row in the lengthwise 2802 direction, where each first rail subsection 2817 is part of a respective drum core discrete inductor 2801 instance. Similarly, second rail 2818 includes a plurality of second rail subsections 2819 disposed in a row in the lengthwise 2802 direction, where each second rail subsection 2819 is part of a respective drum core inductor 2801 instance. In some embodiments, adjacent first rail subsections 2817 are separated from each other in the lengthwise 2802 direction by a respective gap 2826, and adjacent second rail subsections 2819 are separated from each other in the lengthwise 2802 direction by a respective gap 2828.

Leakage magnetic structure 2812 includes a plurality of leakage subsections 2813, where each leakage subsection 2813 is disposed between first and second rails 2816 and 2818 in the height 2806 direction. In some embodiments, all leakage subsection 2813 instances are separated from each other in lengthwise 2802 direction, while in some embodiments at least two leakage subsection 2813 instances are joined in the lengthwise 2802 direction. In particular embodiments, leakage magnetic structure 2812 is bounded by first and second rails 2816 and 2818 in the height 2806 direction, as illustrated. The number of leakage subsections 2813 may vary without departing from the scope hereof. For example, in an alternate embodiment, leakage subsections 2813 at ends of coupled inductor 2800 are omitted.

A respective winding 2822 forms one or more turns around each coupling tooth 2820. Coupling magnetic structure 2810 magnetically couples together windings 2822, and coupling magnetic structure 2810 is formed of a first magnetic material having a relatively high magnetic permeability, such as a ferrite material, to promote strong magnetic coupling of windings 2822.

Leakage magnetic structure 2812 is formed of a second magnetic material having a distributed gap, such as powder iron within a binder that is molded or disposed in multiple film layers. Leakage magnetic structure 2812 provides paths for leakage magnetic flux between first rail 2816 and second rail 2818 in the height 2806 direction. The second magnetic material forming leakage magnetic structure 2812 typically has a lower magnetic permeability than the first magnetic material forming coupling magnetic structure 2810, since it is generally desirable that magnetizing inductance of coupled inductor 2800 be significantly greater than leakage inductance of coupled inductor 2800. Desired leakage inductance values are achieved by varying the magnetic permeability of the second magnetic material and/or cross-sectional area of leakage magnetic structure 2812, during the design of coupled inductor 2800.

Coupled inductor 2800 may be modified to include one or more additional instances of drum core discrete inductor 2801 joined in the lengthwise 2802 direction. For example, one alternate embodiment of coupled inductor 2800 includes three instances of drum core discrete inductor 2801 joined in the lengthwise 2802 direction, to achieve a three-winding coupled inductor. Additionally, the configuration of windings 2822 can be varied. For example, windings 2822 can form fewer or greater number of turns than that illustrated. Additionally, although windings 2822 are illustrated as being foil windings, windings 2822 could instead be wire windings or helical windings. Furthermore windings 2822 could terminate on a different side of coupled inductor 2800 than that illustrated, and/or windings 2822 could terminate in a different manner than that illustrated, such as at contacts for surface mount connection to a printed circuit board.

Figure 35:
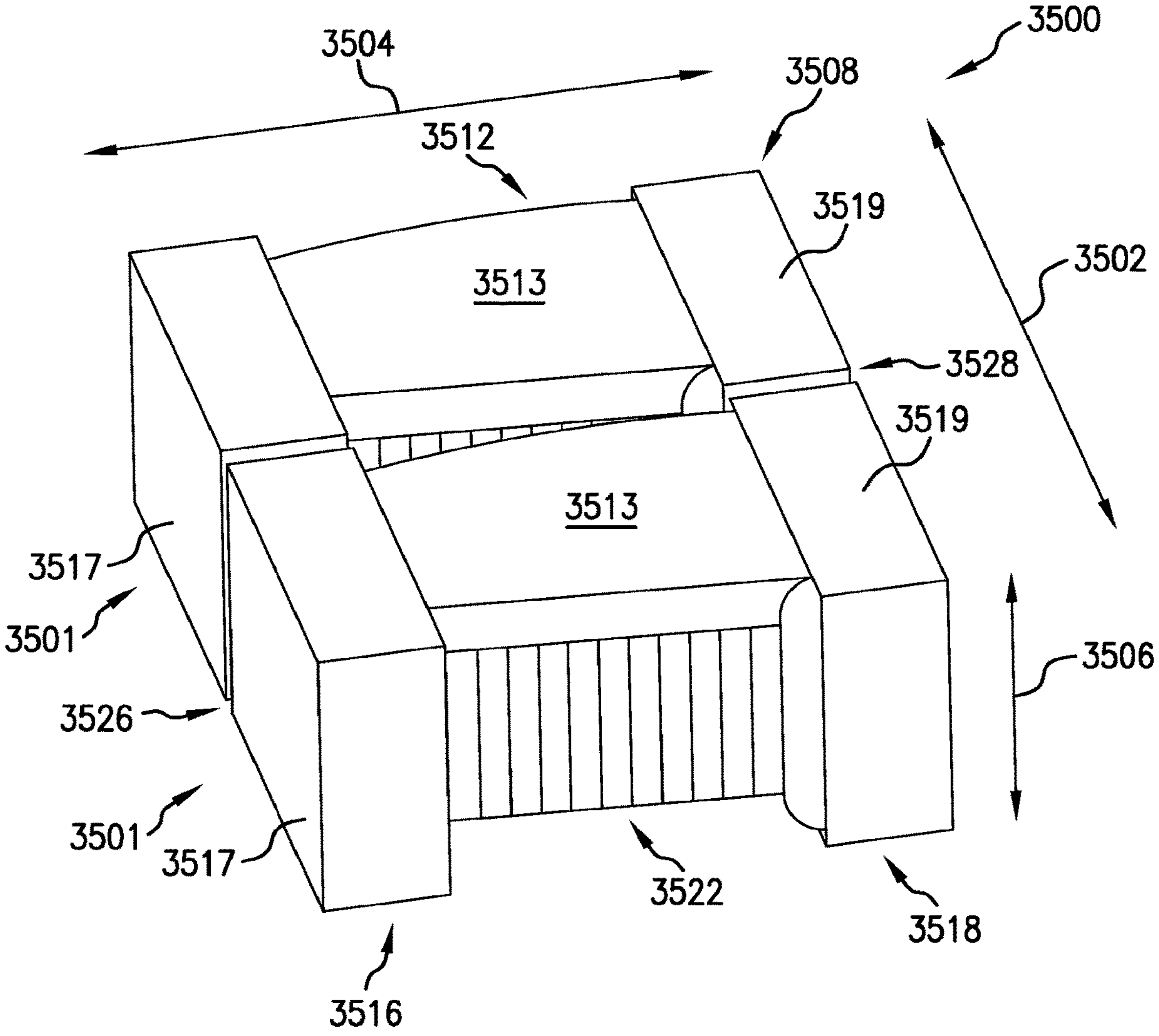
FIG. 35 is a perspective of another coupled inductor for low electromagnetic interference including two discrete drum core inductors, according to an embodiment.
Figure 36:
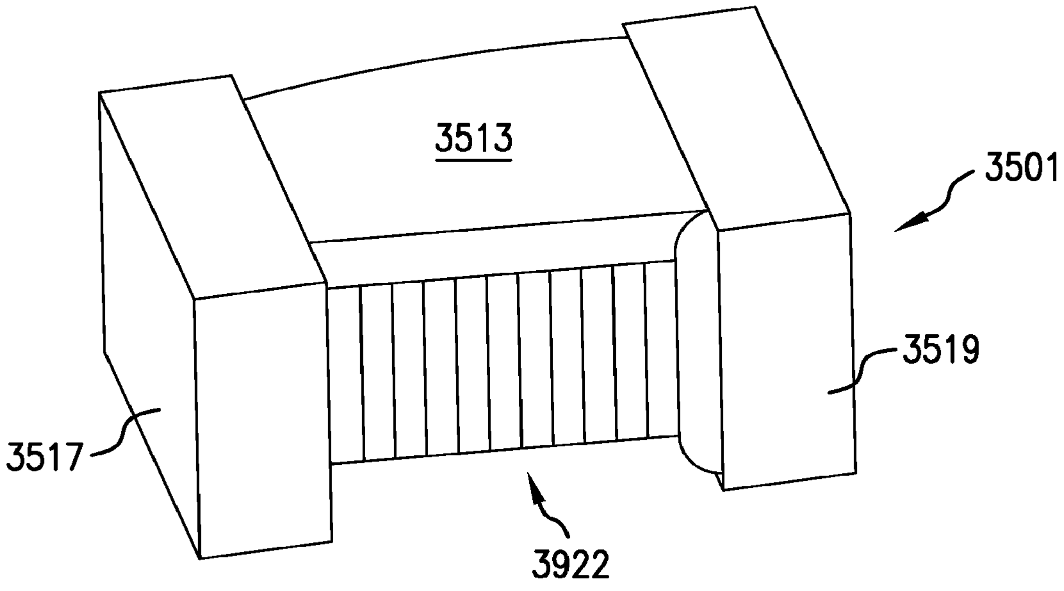
FIG. 36 is a perspective view of one drum core inductor instance and a portion of a leakage magnetic structure separated from the remainder of the FIG. 35 coupled inductor.
Figure 37:
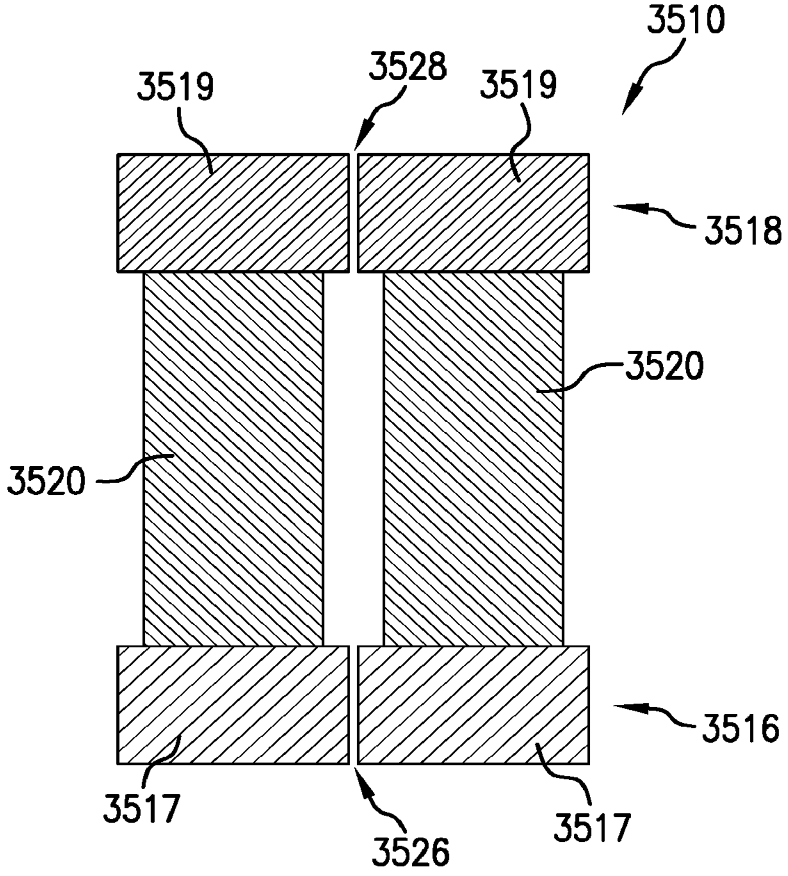
FIG. 37 is a top plan view of a coupling magnetic structure of the FIG. 35 coupled inductor separated from the remainder of the FIG. 35 coupled inductor.

FIGS. 35-37 illustrate another example of a coupled inductor for low electromagnetic interference formed from multiple discrete inductors and a leakage magnetic structure. In particular, FIG. 35 is a perspective of a coupled inductor 3500 for low electromagnetic interference including two drum core discrete inductors 3501 and a leakage magnetic structure 3512. FIG. 36 is a perspective view of one drum core inductor 3501 instance and a portion of leakage magnetic structure 3512 separated from the remainder of coupled inductor 3500. Coupled inductor 3500 has a length 3502, a width 3504, and a height 3506. Drum core discrete inductors 3501 are joined in the lengthwise 3502 rejection.

Leakage magnetic structure 3512 and several elements of drum core discrete inductors 3501 collectively form a composite magnetic core 3508 including a coupling magnetic structure 3510 and leakage magnetic structure 3512. FIG. 37 is a top plan view of coupling magnetic structure 3510 separated from the remainder of coupled inductor 3500. Coupling magnetic structure 3510, which is formed from elements of both instances of drum core discrete inductor 3501, is a ladder magnetic core including a first rail 3516, a second rail 3518, and a plurality of coupling teeth 3520. First rail 3516 is separated from second rail 3518 in the widthwise 3504 direction, and each coupling tooth 3520 is disposed between first rail 3516 and second rail 3518 in the widthwise 3504 direction. First rail 3516 includes a plurality of first rail subsections 3517 disposed in a row in the lengthwise 3502 direction, where each first rail subsection 3517 is part of a respective drum core discrete inductor 3501 instance. Similarly, second rail 3518 includes a plurality of second rail subsections 3519 disposed in a row in the lengthwise 3502 direction, where each second rail subsection 3519 is part of a respective drum core inductor 3501 instance. In some embodiments, adjacent first rail subsections 3517 are separated from each other in the lengthwise 3502 direction by a respective gap 3526, and adjacent second rail subsections 3519 are separated from each other in the lengthwise 3502 direction by a respective gap 3528.

Leakage magnetic structure 3512 includes a plurality of leakage subsections 3513, where each leakage subsection 3513 is disposed between first and second rails 3516 and 3518 in the widthwise 3504 direction. In some embodiments, all leakage subsection 3513 instances are separated from each other in lengthwise 3502 direction, as illustrated, while in some other embodiments, at least two leakage subsection 3513 instances are joined in the lengthwise 3502 direction. In particular embodiments, leakage magnetic structure 3512 is bounded by first and second rails 3516 and 3518 in the widthwise 3504 direction, as illustrated. The number and configuration of leakage subsections 3513 may vary without departing from the scope hereof. For example, an alternate embodiment of coupled inductor 3500 further includes a respective leakage subsection 3513 below each coupling tooth 3510, as well as the two illustrated leakage subsections above coupling teeth 3510 illustrated in FIG. 35. Although leakage subsections 3513 are illustrated as having an arcuate shape, the shape of leakage subsections 3513 may vary without departing from the scope hereof. For example, in some embodiments, leakage subsections 3513 have a rectangular shape.

A respective winding 3522 forms one or more turns around each coupling tooth 3520. Only one winding 3522 instance is visible in the FIG. 35 perspective view. Coupling magnetic structure 3510 magnetically couples together windings 3522, and coupling magnetic structure 3510 is formed of a first magnetic material having a relatively high magnetic permeability, such as a ferrite material, to promote strong magnetic coupling of windings 3522.

Leakage magnetic structure 3512 is formed of a second magnetic material having a distributed gap, such as powder iron within a binder that is molded or disposed in multiple film layers. Leakage magnetic structure 3512 provides paths for leakage magnetic flux between first rail 3516 and second rail 3518 in the widthwise 3504 direction. The second magnetic material forming leakage magnetic structure 3512 typically has a lower magnetic permeability than the first magnetic material forming coupling magnetic structure 3510, since it is generally desirable that magnetizing inductance of coupled inductor 3500 be significantly greater than leakage inductance of coupled inductor 3500. Desired leakage inductance values are achieved by varying the magnetic permeability of the second magnetic material and/or cross-sectional area of leakage magnetic structure 3512, during the design of coupled inductor 3500.

Coupled inductor 3500 may be modified to include one or more additional instances of drum core discrete inductor 3501 joined in the lengthwise 3502 direction. For example, one alternate embodiment of coupled inductor 3500 includes three instances of drum core discrete inductor 3501 joined in the lengthwise 3502 direction, to achieve a three-winding coupled inductor. Additionally, the configuration of windings 3522 can be varied. For example, windings 3522 can form fewer or greater number of turns than that illustrated. Additionally, although windings 3522 are illustrated as being wire windings, windings 3522 could instead be foil windings or helical windings. Furthermore, windings 3522 could terminate on a different side of coupled inductor 3500 than that illustrated, and/or windings 3522 could terminate in a different manner than that illustrated, such as at contacts for surface mount connection to a printed circuit board.

Figure 38:
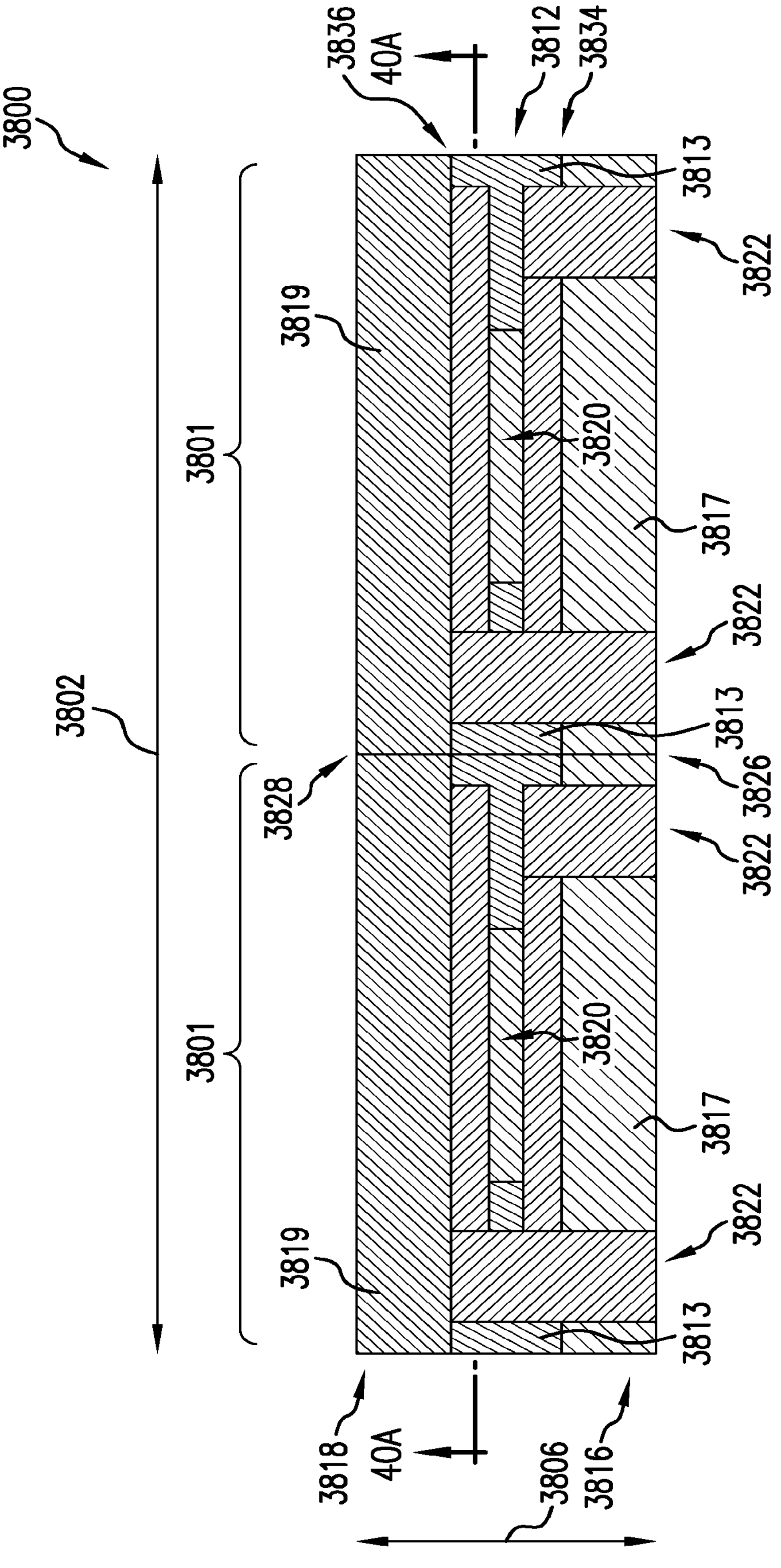
FIG. 38 is a front elevational of yet another coupled inductor for low electromagnetic interference including two discrete drum core inductors, according to an embodiment.
Figure 39:
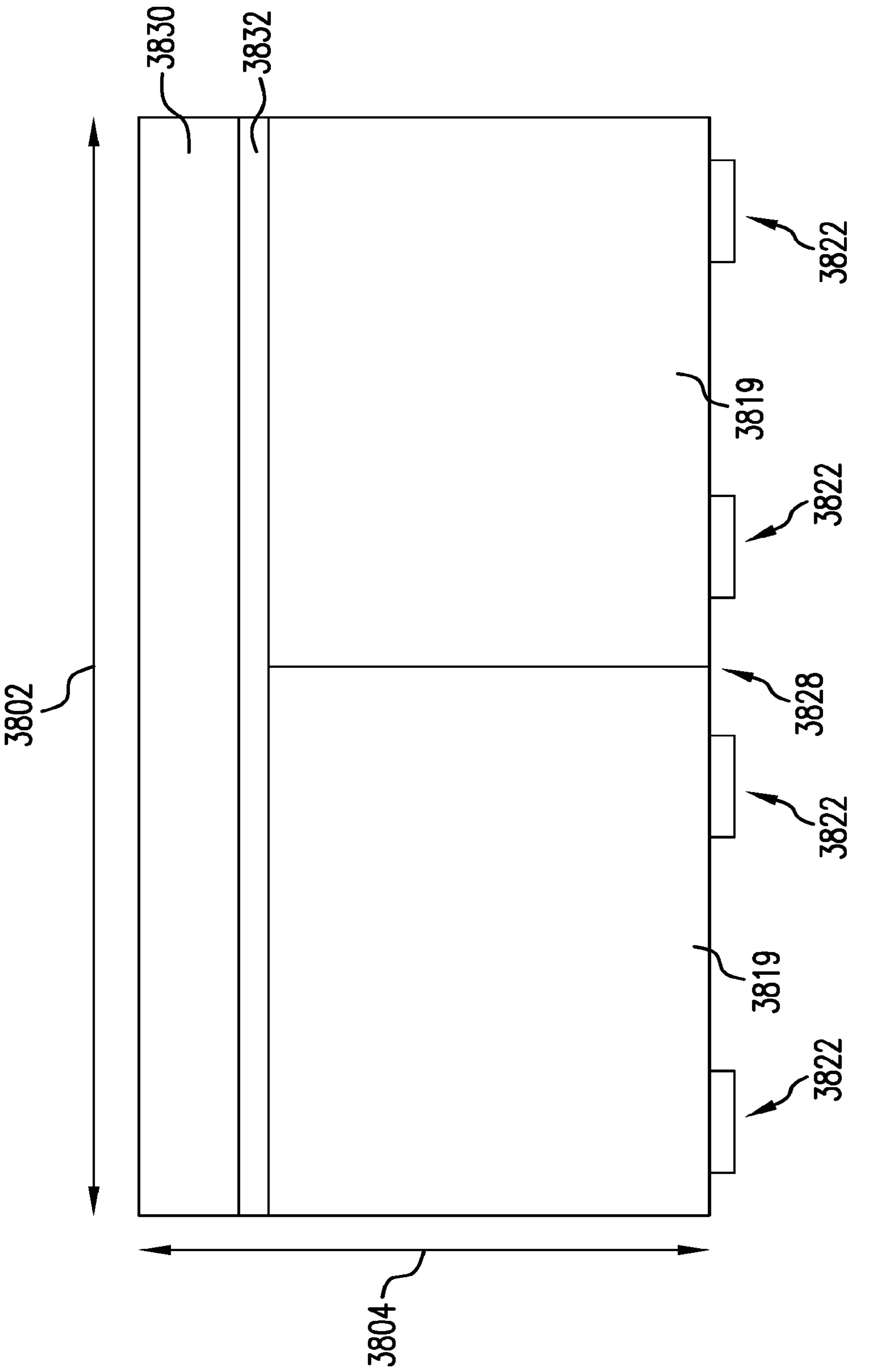
FIG. 39 is a top plan view of the FIG. 38 coupled inductor.
Figure 40:
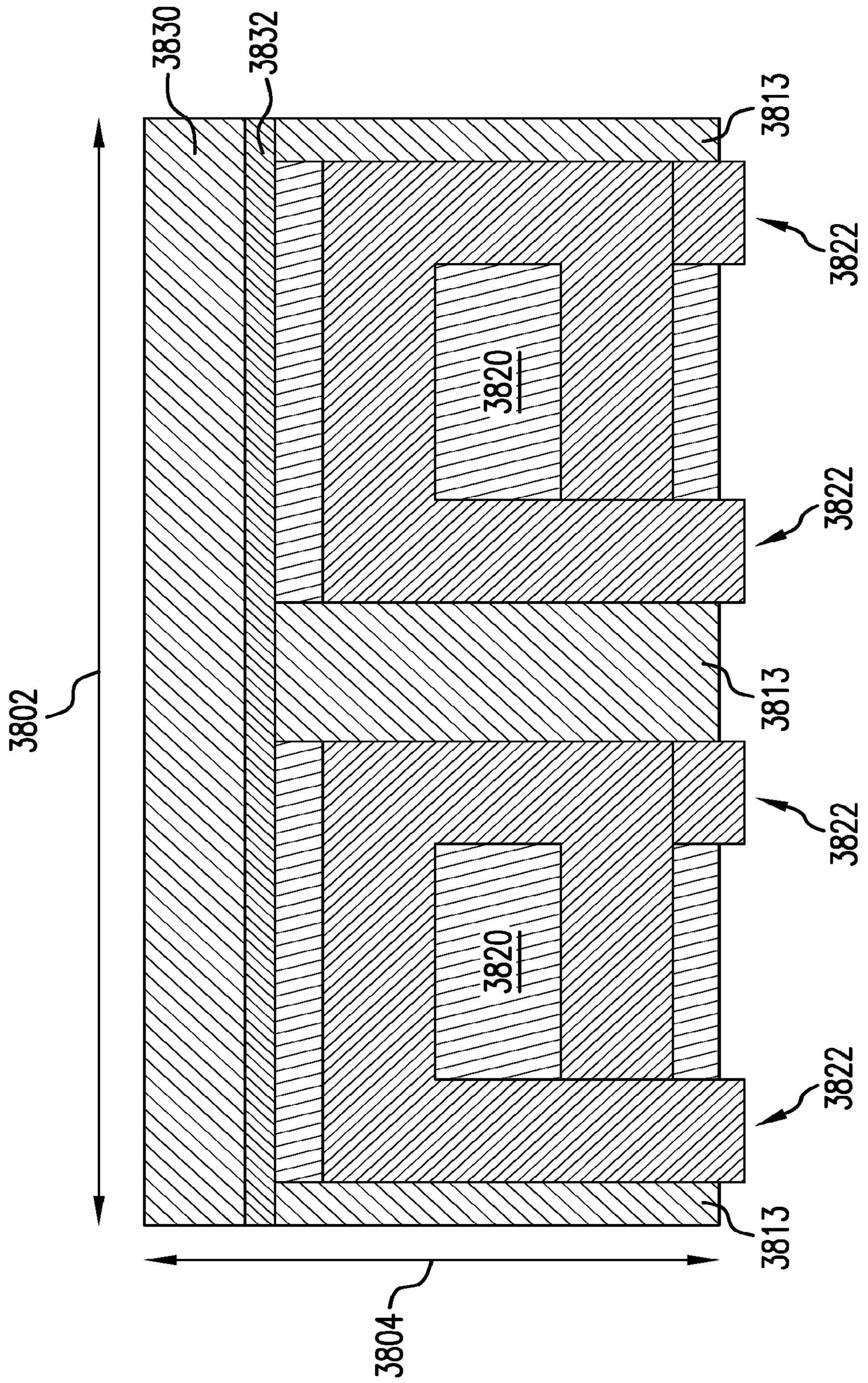
FIG. 40 is a cross-sectional view of the FIG. 38 coupled inductor taken along line 40A-40A of FIG. 38.
Figure 41:
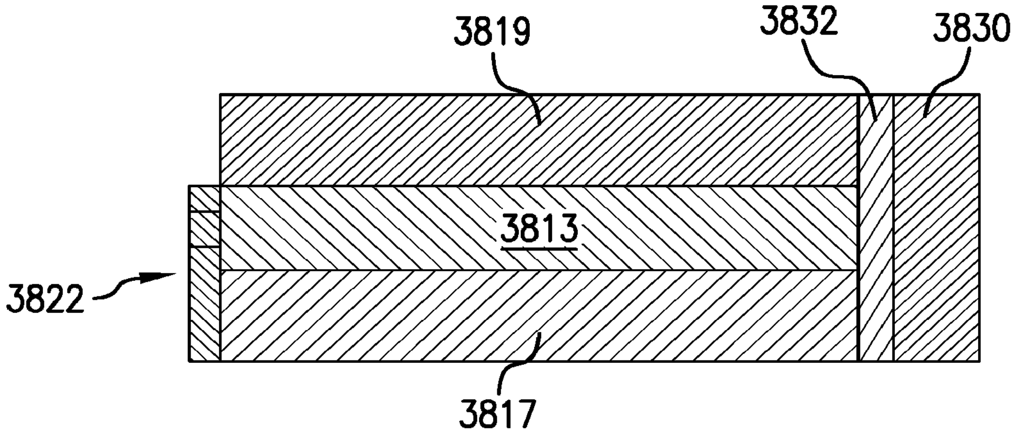
FIG. 41 is a side elevational view of the FIG. 38 coupled inductor.
Figure 42:
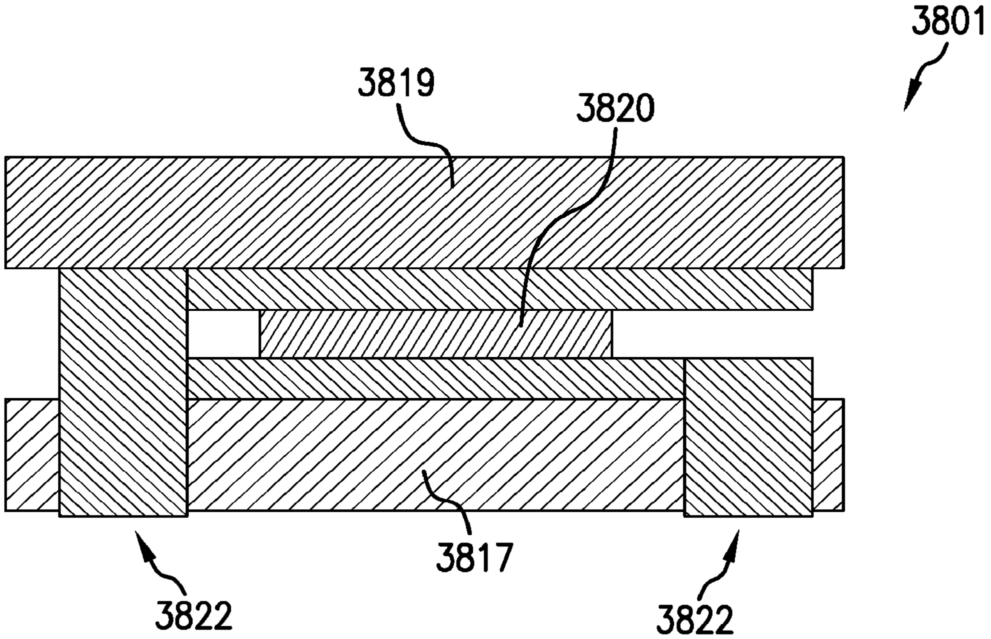
FIG. 42 is a front elevational view of one drum core discrete inductor instance separated from the remainder of the FIG. 38 coupled inductor.

FIGS. 38-43 illustrate yet another example of a coupled inductor for low electromagnetic interference formed from multiple discrete inductors. In particular, FIG. 38 is a front elevational of a coupled inductor 3800 for low electromagnetic interference including two discrete drum core inductors 3801. FIG. 39 is a top plan view of coupled inductor 3800, FIG. 40 is a cross-sectional view of coupled inductor 3800 taken along line 40A-40A of FIG. 38, FIG. 41 is a side elevational view of coupled inductor 3800, and FIG. 42 is a front elevational view of one drum core discrete inductor 3801 instance separated from the remainder of coupled inductor 3800. Coupled inductor 3800 has a length 3802, a width 3804, and a height 3806. Drum core discrete inductors 3801 are joined in the lengthwise 3802 rejection.

Figure 43:
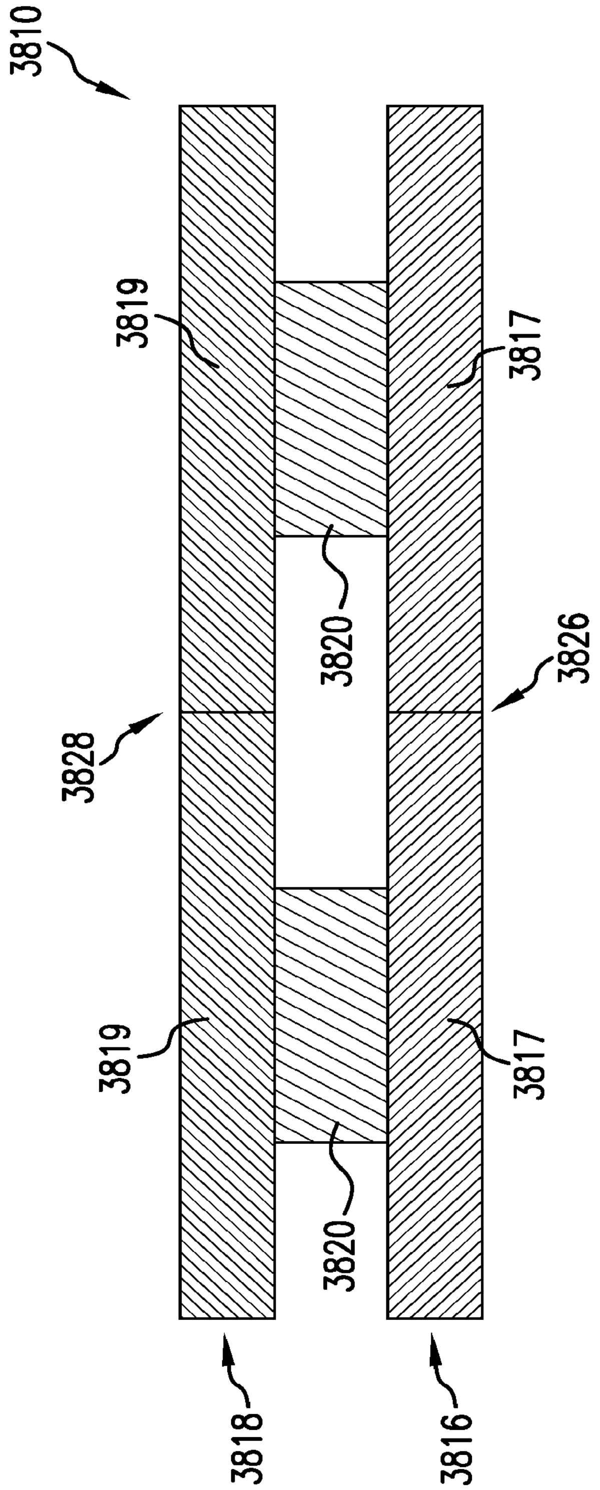
FIG. 43 is a front elevational view of a coupling magnetic structure separated from the remainder of the FIG. 38 coupled inductor.

Several elements of drum core discrete inductors 3801 form a coupling magnetic structure 3810, and coupled inductor 3800 additionally includes a leakage magnetic structure 3812. FIG. 43 is a front elevational view of coupling magnetic structure 3810 separated from the remainder of coupled inductor 3800. Coupling magnetic structure 3810, which is formed from elements of both instances of drum core discrete inductor 3801, is a ladder magnetic core including a first rail 3816, a second rail 3818, and a plurality of coupling teeth 3820. First rail 3816 is separated from second rail 3818 in the height 3806 direction, and each coupling tooth 3820 is disposed between first rail 3816 and second rail 3818 in the height 3806 direction. First rail 3816 includes a plurality of first rail subsections 3817 disposed in a row in the lengthwise 3802 direction, where each first rail subsection 3817 is part of a respective drum core discrete inductor 3801 instance. Similarly, second rail 3818 includes a plurality of second rail subsections 3819 disposed in a row in the lengthwise 3802 direction, where each second rail subsection 3819 is part of a respective drum core inductor 3801 instance. In some embodiments, adjacent first rail subsections 3817 are separated from each other in the lengthwise 3802 direction by a respective gap 3826, and adjacent second rail subsections 3819 are separated from each other in the lengthwise 3802 direction by a respective gap 3828.

Leakage magnetic structure 3812 includes one or more inner leakage plates 3813 and an outer leakage plate 3830. Each inner leakage plate 3813 is disposed between first and second rails 3816 and 3818 in the height 3806 direction. Outer leakage plate 3830 bridges first and second rails 3816 and 3818 in the height 3806 direction, and outer leakage plate 3830 is non-overlapping with first and second rails 3816 and 3818 as seen when coupled inductor 3800 is viewed cross-sectionally in the height 3806 direction. Outer leakage plate 3830 is optionally separated from first and second rails 3816 and 3818 in the widthwise 3804 direction, such as by a non-magnetic spacer 3832, as illustrated. Each inner leakage plate 3813 is optionally separated from first and second rails 3816 and 3818 by a respective gap 3834 and 3836. Only one instance of each of gaps 3834 and 3836 is labeled to promote illustrative clarity. The number and configuration of inner leakage plates 3813 may vary without departing from the scope hereof.

A respective winding 3822 forms one or more turns around each coupling tooth 3820. Coupling magnetic structure 3810 magnetically couples together windings 3822, and leakage magnetic structure 3812 provides paths for leakage magnetic flux between first rail 3816 and second rail 3818 in the height 3806 direction. In certain embodiments, each of coupling magnetic structure 3810 and leakage magnetic structure 3812 are formed of material having a high magnetic permeability, such as a ferrite material.

Coupled inductor 3800 may be modified to include one or more additional instances of drum core discrete inductor 3801 joined in the lengthwise 3802 direction. For example, one alternate embodiment of coupled inductor 3800 includes three instances of drum core discrete inductor 3801 joined in the lengthwise 3802 direction, to achieve a three-winding coupled inductor. Additionally, the configuration of windings 3822 can be varied. For example, windings 3822 can form fewer or greater number of turns than that illustrated. Additionally, although windings 3822 are illustrated as being foil windings, windings 3822 could instead be wire windings or helical windings. Furthermore, windings 3822 could terminate on a different side of coupled inductor 3800 than that illustrated, and/or windings 3822 could terminate in a different manner than that illustrated, such as at contacts for surface mount connection to a printed circuit board.

Applicant has determined that forming a coupled inductor for low electromagnetic interference from multiple discrete inductors can achieve significant advantages. For example, forming a coupled inductor from multiple discrete inductors promotes scalability by enabling different numbers of windings to be realized simply varying the number of discrete inductors that are joined together. Additionally, forming a coupled inductor from multiple discrete inductors promotes manufacturing simplicity. In particular, conventional coupled inductor magnetic cores typically have a complex shape, and it can be difficult to assemble windings on such complex-shaped magnetic cores. Discrete inductor magnetic cores, in contrast, typically have a relatively simple shape, such as a drum shape, and therefore, it is generally simpler to assemble a winding on a discrete inductor magnetic core than on a coupled inductor magnetic core. Forming a coupled inductor from multiple discrete inductors promotes manufacturing simplicity by enabling windings to be assembled on discrete inductor magnetic cores having relatively simple shapes.

Furthermore, forming a coupled inductor from multiple discrete inductors promotes manufacturing simplicity and high manufacturing yield when forming small coupled inductors. In particular, conventional coupled inductor magnetic cores typically have a complex shape, as discussed above, and small magnetic cores having complex shapes are prone to crack during manufacturing. Magnetic cores for discrete inductors, however, typically have a relatively simple shape, as discussed above. Consequently, forming a coupled inductor from multiple discrete inductors promotes manufacturing simplicity and high manufacturing yield by reducing, or even eliminating, the need to work with small, complex-shaped magnetic cores during manufacturing.

Combinations of Features

Features described above may be combined in various ways without departing from the scope hereof. The following examples illustrate some possible combinations:

(A1) A coupled inductor for low electromagnetic interference may include a plurality of windings and a composite magnetic core including a coupling magnetic structure formed of a first magnetic material and a leakage magnetic structure formed of a second magnetic material having a distributed gap. The coupling magnetic structure may magnetically couple together the plurality of windings, and the leakage magnetic structure may provide leakage magnetic flux paths for the plurality of windings.

(A2) In the coupled inductor denoted as A1, the first magnetic material may have a greater magnetic permeability than the second magnetic material.

(A3) In any one of the coupled inductors denoted as A1 and A2, the first magnetic material may include a ferrite material and the second magnetic material may include a powder iron material within a binder.

(A4) In any one of the coupled inductors denoted as A1 through A3, the leakage magnetic structure may at least partially cover the plurality of windings.

(A5) In any one of the coupled inductors denoted as A1 through A4, the coupling magnetic structure may include (1) first and second rails separated from each other in a first direction and (2) a plurality of rungs. Each of the plurality of the rungs may join the first and second rails in the first direction, and each of the plurality of windings may be at least partially wound around a respective one of the plurality of rungs.

(A6) In the coupled inductor denoted as A5, the composite magnetic core may be configured such that the leakage magnetic structure provides a path for leakage magnetic flux in the first direction between the first and second rails.

(A7) In any one of the coupled inductors denoted as A5 and A6, the leakage magnetic structure may be bounded by the first and second rails, in the first direction.

(A8) In any one of the coupled inductors denoted as A5 through A7, the second rail may have a u-shape as seen when the second rail is cross-sectionally viewed in a second direction orthogonal to the first direction.

(A9) In any one of the coupled inductors denoted as A5 and A6, the leakage magnetic structure may have a u-shape as seen when the coupled inductor is viewed cross-sectionally in the first direction.

(A10) In the coupled inductor denoted as A9, the leakage magnetic structure may be bounded by the first and second rails, in the first direction.

(A11) In the coupled inductor denoted as A5, the first rail may include a plurality of first rail subsections disposed in a row in a second direction orthogonal to the first direction, and the second rail may include a plurality of second rail subsections disposed in a row in the second direction.

(A12) In the coupled inductor denoted as A11, adjacent first rail subsections may be separated from each other in the second direction, and adjacent second rail subsections may be separated from each other in the second direction.

(A13) In any one of the coupled inductors denoted as A11 and A12, the leakage magnetic structure may be bounded by the first and second rails, in the first direction.

(A14) In any one of the coupled inductors denoted as A11 through A13, the leakage magnetic structure may include a plurality of leakage subsections joined in the second direction.

(A15) In any one of the coupled inductors denoted as A11 through A13, the leakage magnetic structure may include a plurality of leakage subsections separated from each other in the second direction.

(A16) In any one of the coupled inductors denoted as A1 through A15, the coupling magnetic structure may be at least partially embedded in the leakage magnetic structure.

(A17) Any of the coupled inductors denoted as A1 through A16 may further include one or more magnetic flux impeding structures embedded in the leakage magnetic structure.

(B1) A coupled inductor for low electromagnetic interference may include a plurality of windings and a coupling magnetic structure. The coupling magnetic structure may include (1) a first rail including a plurality of first rail subsections disposed in a row in a first direction, (2) a second rail, separated from the first rail in a second direction orthogonal to the first direction, including a plurality of second rail subsections disposed in a row in the first direction, and (3) a plurality of rungs, each of the plurality of the rungs joining the first and second rails in the second direction. Each of the plurality of windings may be at least partially wound around a respective one of the plurality of rungs. The leakage magnetic structure may include (1) one or more inner leakage plates disposed between the first and second rails in the second direction, and (2) an outer leakage plate bridging the first and second rails in the second direction. The outer leakage plate may be non-overlapping with the first and second rails, as seen when the coupled inductor is viewed cross-sectionally in the second direction.

(B2) In the coupled inductor denoted as B1, each inner leakage plate may be separated from each of the first and second rails in the second direction, and the outer leakage plate may be separated from each of the first and second rails in a third direction orthogonal to each of the first and second directions.

(B3) In any one of the coupled inductors denoted as B1 and B2, each of the coupling magnetic structure and the leakage magnetic structure are may be formed of one or more ferrite magnetic materials.

(C1) A coupled inductor for low electromagnetic interference may include (1) a plurality of windings, (2) a magnetic core magnetically coupling together the plurality of windings, the magnetic core forming a gap in a leakage magnetic flux path of the coupled inductor, and (3) a metal shield disposed on an outer surface of magnetic core and at least partially covering the gap.

(C2) In the coupled inductor denoted as C1, the magnetic core may include (1) first and second rails separated from each other in a first direction, (2) a plurality of coupling teeth, each coupling tooth disposed between the first and second rails in the first direction, each of the plurality of windings at least partially wound around a respective one of the plurality of coupling teeth, and (3) a leakage plate bridging the first and second rails in the first direction, the leakage plate forming the gap in the leakage magnetic flux path.

(D1) A switching power converter may include any one of the coupled inductors denoted as A1 through A17, B1 through B3, C1, and C2.

Changes may be made in the above-described coupled inductors, systems, and methods without departing from the scope hereof. For example, although rails and coupling teeth are illustrated as being rectangular, the shape of these elements may be varied. It should thus be noted that the matter contained in the above description and shown in the accompanying drawings should be interpreted as illustrative and not in a limiting sense. The following claims are intended to cover generic and specific features described herein, as well as all statements of the scope of the present devices, methods, and system, which, as a matter of language, might be said to fall therebetween.

What is claimed is:

1. A coupled inductor for low electromagnetic interference, comprising:

a plurality of windings; and a composite magnetic core including a coupling magnetic structure formed of a first magnetic material at least partially embedded in a leakage magnetic structure formed of a second magnetic material having a distributed gap, the first magnetic material having greater magnetic permeability than the second magnetic material, and the coupling magnetic structure magnetically coupling together the plurality of windings and having (a) first and second rails separated from each other in a first direction and (b) coupling teeth connecting between the first and second rails along a second direction, the first and second rails extending beyond the coupling teeth in the second direction and being longer than the coupling teeth in a third direction orthogonal to the first and second direction, the plurality of windings at least partially wrapping the coupling teeth, the leakage magnetic structure encapsulating the coupling teeth between the first and second rails and wherein the coupling teeth forming small gaps in series with the magnetic structure to control magnetizing inductance of the coupled inductor.

2. The coupled inductor of claim 1, the first magnetic material comprising ferrite material, the second magnetic material comprising powdered iron within a binder.

3. The coupled inductor of claim 1, the leakage magnetic structure at least partially covering the plurality of windings.

4. The coupled inductor of claim 1, wherein the leakage magnetic structure provides a path for leakage magnetic flux in the first direction between the first and second rails.

5. The coupled inductor of claim 1, the leakage magnetic structure being bounded by the first and second rails, in the first direction.

6. The coupled inductor of claim 1, the leakage magnetic structure bounded by the first and second rails in the second direction.

7. The coupled inductor of claim 1, the leakage magnetic structure being bounded by the first and second rails in the third direction.

8. The coupled inductor of claim 1, the coupling magnetic structure being at least partially embedded in the leakage magnetic structure.

9. The coupled inductor of claim 1, the coupling teeth being rectangular.

10. The coupled inductor of claim 1, wherein the plurality of windings terminate at an end of the third direction, opposite to the leakage magnetic structure.

11. The coupled inductor of claim 10, further comprising soldering contacts at the end.

12. The coupled inductor of claim 1, wherein the coupling magnetic structure and the leakage magnetic structure comprise one or more ferrite magnetic materials.

13. The coupled inductor of claim 1, wherein the coupling teeth consist of four coupling teeth and the plurality of windings consist of four windings.

14. The coupled inductor of claim 1, the composite magnetic core being free of exposed air gaps.

15. The coupled inductor of claim 1, the leakage magnetic structure shielding the plurality of windings from external circuitry.

16. The coupled inductor of claim 1, wherein the plurality of windings comprise foil.

17. A coupled inductor for low electromagnetic interference, comprising:

a plurality of windings; and a composite magnetic core including a coupling magnetic structure formed of a first magnetic material at least partially embedded in a leakage magnetic structure formed of a second magnetic material having a distributed gap, the coupling magnetic structure magnetically coupling together the plurality of windings and having (a) first and second rails separated from each other in a first direction and (b) coupling teeth connecting between the first and second rails along a second direction, the coupling teeth forming small gaps in series with the magnetic structure to control magnetizing inductance of the coupled inductor, and the first and second rails extending beyond the coupling teeth in the second direction and being longer than the coupling teeth in a third direction orthogonal to the first and second direction, the plurality of windings at least partially wrapping the coupling teeth, the leakage magnetic structure encapsulating the coupling teeth between the first and second rails.

18. A coupled inductor for low electromagnetic interference, comprising:

a plurality of windings; and a composite magnetic core including a coupling magnetic structure formed of a first magnetic material at least partially embedded in a leakage magnetic structure formed of a second magnetic material having a distributed gap, the composite magnetic core being free of exposed air gaps, and the coupling magnetic structure magnetically coupling together the plurality of windings and having (a) first and second rails separated from each other in a first direction and (b) coupling teeth connecting between the first and second rails along a second direction, the first and second rails extending beyond the coupling teeth in the second direction and being longer than the coupling teeth in a third direction orthogonal to the first and second direction, the plurality of windings at least partially wrapping the coupling teeth, the leakage magnetic structure encapsulating the coupling teeth between the first and second rails.

* * * * *